US012587826B2

(12) United States Patent
Salmela et al.

(10) Patent No.: US 12,587,826 B2
(45) Date of Patent: Mar. 24, 2026

(54) ROAMING FOR UE OF A NPN

(71) Applicant: Telefonaktiebolaget LM Ericsson (publ), Stockholm (SE)

(72) Inventors: Patrik Salmela, Espoo (FI); Vesa Lehtovirta, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 317 days.

(21) Appl. No.: 18/257,130

(22) PCT Filed: Dec. 28, 2020

(86) PCT No.: PCT/EP2020/087912
§ 371 (c)(1),
(2) Date: Jun. 13, 2023

(87) PCT Pub. No.: WO2022/144064
PCT Pub. Date: Jul. 7, 2022

(65) Prior Publication Data
US 2024/0107288 A1      Mar. 28, 2024

(51) Int. Cl.
*H04W 8/12*          (2009.01)
*H04W 12/06*         (2021.01)

(52) U.S. Cl.
CPC ............. *H04W 8/12* (2013.01); *H04W 12/06* (2013.01)

(58) Field of Classification Search
CPC ....... H04W 12/06; H04W 12/37; H04W 8/12; H04W 8/186; H04W 84/10
See application file for complete search history.

(56) References Cited

U.S. PATENT DOCUMENTS

| | | | | |
|---|---|---|---|---|
| 12,289,597 B2 * | 4/2025 | Baskaran | .............. | H04W 12/02 |
| 12,342,162 B2 * | 6/2025 | Hu | .......... | H04W 12/06 |
| 2020/0396673 A1 * | 12/2020 | Tiwari | .................. | H04W 12/06 |
| 2020/0396788 A1 * | 12/2020 | Tiwari | .................. | H04W 76/11 |
| 2021/0168881 A1 * | 6/2021 | Kedalagudde | ........ | H04W 76/10 |
| 2022/0104009 A1 * | 3/2022 | Baskaran | .............. | H04W 12/72 |
| 2022/0312215 A1 * | 9/2022 | Tangudu | ............. | H04L 63/1458 |
| 2022/0377548 A1 * | 11/2022 | Rajadurai | ............. | H04W 12/08 |
| 2023/0029655 A1 * | 2/2023 | Foti | ..................... | H04L 65/1046 |

(Continued)

OTHER PUBLICATIONS

3GPP, "3GPP TS 23.003 V16.4.0", 3rd Generation Partnership Project; Technical Specification Group Core Network and Terminals; Numbering, addressing and identification; (Release 16), Sep. 2020, 1-86.

(Continued)

*Primary Examiner* — Khawar Iqbal
(74) *Attorney, Agent, or Firm* — Sonoda & Kobayashi Intellectual Property Law; Sarvajit S. Patil

(57) ABSTRACT

A first network node (20N) in a first communication network (20) transmits information to a second network node (10N) in a second communication network (10). The information indicates a third communication network (30) is in a control signaling path (15) between a communication device (2) and the second communication network (10). In some embodiments, the first network node (20N) and/or the second network node (10N) may apply one or more policies based on the information, e.g., whether to authenticate a subscription of the communication device (2) to the second communication network (10).

15 Claims, 15 Drawing Sheets

(56) References Cited

U.S. PATENT DOCUMENTS

| | | | | |
|---|---|---|---|---|
| 2023/0041493 | A1* | 2/2023 | Tiwari | H04W 76/40 |
| 2023/0362653 | A1* | 11/2023 | Tangudu | H04W 12/068 |
| 2024/0196205 | A1* | 6/2024 | Baskaran | H04W 12/72 |
| 2024/0224163 | A1* | 7/2024 | Starsinic | H04W 60/04 |

OTHER PUBLICATIONS

3GPP, "3GPP TS 23.401 V16.8.0", 3rd Generation Partnership Project; Technical Specification Group Services and System Aspects; General Packet Radio Service (GPRS) enhancements for Evolved Universal Terrestrial Radio Access Network (E-UTRAN) access (Release 16), Sep. 2020, 1-440.

3GPP, "3GPP TS 33.220 V16.2.0", 3rd Generation Partnership Project; Technical Specification Group Services and System Aspects; Generic Authentication Architecture (GAA); Generic Bootstrapping Architecture (GBA) (Release 16), Sep. 2020, 1-93.

3GPP, "3GPP TS 36.331 V16.1.0", 3rd Generation Partnership Project; Technical Specification Group Radio Access Network; Evolved Universal Terrestrial Radio Access (E-UTRA); Radio Resource Control (RRC); Protocol specification (Release 16), Jul. 2020, 1-1078.

3GPP, "3rd Generation Partnership Project; Technical Specification Group Services and System Aspects; Security architecture and procedures for 5G system (Release 16)", 3GPP TS 33.501 V16.4.0, Sep. 2020, 1-250.

3GPP, "3rd Generation Partnership Project; Technical Specification Group Services and System Aspects; System architecture for the 5G System (5GS); Stage 2 (Release 16)", 3GPP TS 23.501 V16.6.0, Sep. 2020, 1-447.

Huawei, et al., "Amendment to Key Issue#2.1", 3GPP TSG SA WG3 (Security) Meeting #95, S3-191348, revision of S3-19abcd, Reno (US), May 6-10, 2019, 1-2.

Intel, "Regulatory requirements for N3IWF selection for SNPN access via a PLMN", 3GPP TSG-SA WG2 Meeting #137-E, S2-2002007, (revision of S2-200xxxx), Electronic meeting, Feb. 24-27, 2020, 1-6.

Nokia, et al., "Background to and key issues for VERTICAL_LAN_SEC study", 3GPP TSG SA WG3 (Security) Meeting #93, S3-193488 (revision of 18xabc), Spokane (US), Nov. 12-16, 2018, 1-5.

* cited by examiner

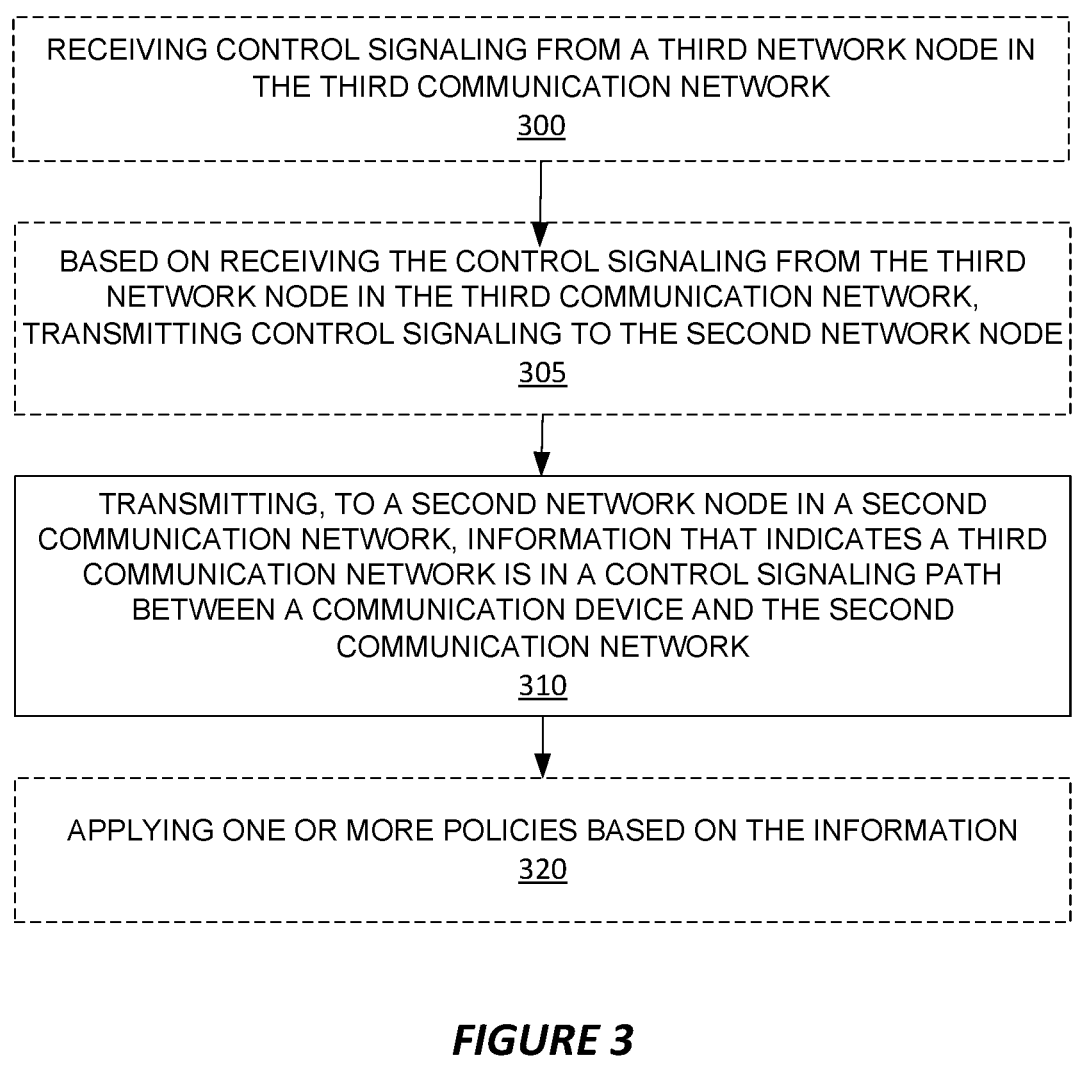

RECEIVING CONTROL SIGNALING FROM A THIRD NETWORK NODE IN THE THIRD COMMUNICATION NETWORK
300

BASED ON RECEIVING THE CONTROL SIGNALING FROM THE THIRD NETWORK NODE IN THE THIRD COMMUNICATION NETWORK, TRANSMITTING CONTROL SIGNALING TO THE SECOND NETWORK NODE
305

TRANSMITTING, TO A SECOND NETWORK NODE IN A SECOND COMMUNICATION NETWORK, INFORMATION THAT INDICATES A THIRD COMMUNICATION NETWORK IS IN A CONTROL SIGNALING PATH BETWEEN A COMMUNICATION DEVICE AND THE SECOND COMMUNICATION NETWORK
310

APPLYING ONE OR MORE POLICIES BASED ON THE INFORMATION
320

*FIGURE 3*

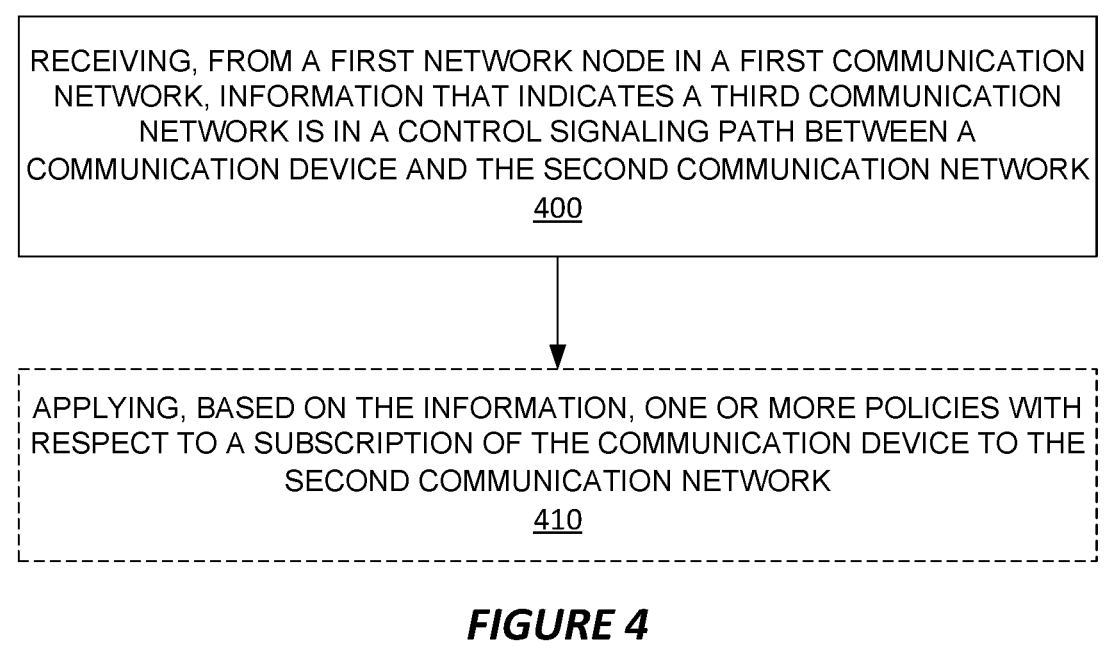

RECEIVING, FROM A FIRST NETWORK NODE IN A FIRST COMMUNICATION NETWORK, INFORMATION THAT INDICATES A THIRD COMMUNICATION NETWORK IS IN A CONTROL SIGNALING PATH BETWEEN A COMMUNICATION DEVICE AND THE SECOND COMMUNICATION NETWORK
400

APPLYING, BASED ON THE INFORMATION, ONE OR MORE POLICIES WITH RESPECT TO A SUBSCRIPTION OF THE COMMUNICATION DEVICE TO THE SECOND COMMUNICATION NETWORK
410

FIGURE 4

ROAMING FOR UE OF A NPN

TECHNICAL FIELD

The present application relates generally to a communication network, and relates more particularly to access to such a network.

BACKGROUND

A communication network provides communication services to a subscriber that subscribes to receive those services. The communication network to which a subscriber has subscribed is referred to as the subscriber's home network. A subscriber can access its home network using any radio access network (RAN) provided by the home network itself. The geographical coverage area of the home network's RAN may be limited, though. The home network operator can nonetheless extend the geographical reach over which its communication services are accessible to its subscribers, by partnering with another communication network operator that agrees to share its RAN with the home network operator. With such a roaming partnership in place, subscribers can use the RAN that a so-called visited communication network shares with the home communication network in order to access the communication services of the home communication network, even when roaming outside of the home network's radio access coverage area.

The direct partnership between a communication device's home network and a visited network means that the communication device can roam to the visited network without compromising security requirements imposed by the home network. Indeed, the direct nature of the partnership means that the home network can remain in control of which visited network(s) are usable to access the home network. However, limiting roaming to only those visited networks with which the home network has a direct partnership in turn limits the coverage areas over which communication devices can access the services of the home network.

SUMMARY

Some embodiments herein inform a communication network about any intermediate communication network(s) that are in the control signaling path between a communication device and the communication network. One or more embodiments, for example, inform the communication network about the existence of and/or identity of such intermediate communication network(s), e.g., which may form a chain of intermediate networks via which the communication device accesses the communication network. Accordingly, rather than being ignorant of an intermediate network via which the communication device accesses the communication network, because the communication network does not have a direct roaming partnership with that intermediate network, the communication network is equipped with information about such an intermediate network. The communication network can then use this information for any number of policy decisions, e.g., whether to permit access via the intermediate network, whether to permit a certain service when accessed via the intermediate network, etc. Some embodiments thereby safeguard the communication network's ability to control which intermediate network(s) are used to access the communication network, even when the communication devices access the communication network via a an intermediate network that does not have a direct roaming partnership with the communication network.

More particularly, embodiments herein include a method performed by a first network node in a first communication network. The method comprises transmitting, to a second network node in a second communication network, information that indicates a third communication network is in a control signaling path between a communication device and the second communication network.

In some embodiments, the information indicates at least a portion of an identity or name of the third communication network that is in the control signaling path.

In some embodiments, the information indicates a third communication network is in the control signaling path, without indicating any portion of an identity or name of the third communication network.

In some embodiments, the information indicates a third communication network is in the control signaling path by indicating that the communication device is roaming or that the communication device is served by a visited communication network.

In some embodiments, the information indicates a third communication network is in the control signaling path by indicating that a visited communication network of the communication device is in the control signaling path. Additionally or alternatively, the information indicates a third communication network is in the control signaling path by indicating an identity or name of the visited communication network.

In some embodiments, the method further comprises receiving control signaling from a third network node in the third communication network, and based on receiving the control signaling from the third network node in the third communication network, transmitting control signaling to the second network node. In this case, the information is transmitted to the second network node in association with transmitting the control signaling to the second network node. In one or more of these embodiments, the control signaling received from the third network node is an authentication request requesting authentication of a subscription of the communication device to the second communication network. Additionally or alternatively, the control signaling transmitted to the second network node is an authentication request requesting authentication of a subscription of the communication device to the second communication network.

In some embodiments, the method further comprises transmitting, to the second network node, an authentication request requesting authentication of a subscription of the communication device to the second communication network. In this case, the information is included in the authentication request.

In some embodiments, the information further indicates the first communication network is in the control signaling path between the communication device and the second communication network.

In some embodiments, the second communication network is a non-public network, NPN.

In some embodiments, the second communication network is a public network.

In some embodiments, the first communication network is a public network. Additionally or alternatively, the third communication network is a public network.

In some embodiments, the first communication network is a non-public network. Additionally or alternatively, the third communication network is a non-public network.

In some embodiments, the first network node is an authentication server or implements an authentication server function. Additionally or alternatively, the second network node is an authentication server or implements an authentication server function.

In some embodiments, the third communication network is a roaming partner of the first communication network. In this case, the first communication network is a home public network of the communication device, and the third communication network is a visited network of the communication device.

In some embodiments, the method further comprises applying one or more policies based on the information. In one or more of these embodiments, the one or more policies include a policy that specifies, based on the information, whether the communication device is allowed to register with the first communication network, the second communication network, and/or the third communication network. In one or more of these embodiments, the one or more policies include a policy that specifies, based on the information, which one or more services of the first communication network, the second communication network, and/or the third communication network the communication device is allowed to use. Additionally or alternatively, the one or more policies include a policy that specifies, based on the information, which one or more network slices of the first communication network, the second communication network, and/or the third communication network the communication device is allowed to use.

Other embodiments herein include a method performed by a second network node in a second communication network. The method comprises receiving, from a first network node in a first communication network, information that indicates a third communication network is in a control signaling path between a communication device and the second communication network.

In some embodiments, the information indicates at least a portion of an identity or name of the third communication network that is in the control signaling path.

In some embodiments, the information indicates a third communication network is in the control signaling path, without indicating any portion of an identity or name of the third communication network.

In some embodiments, the information indicates a third communication network is in the control signaling path by indicating that the communication device is roaming or that the communication device is served by a visited communication network.

In some embodiments, the information indicates a third communication network is in the control signaling path by indicating that a visited communication network of the communication device is in the control signaling path. Additionally or alternatively, the information indicates a third communication network is in the control signaling path by indicating an identity or name of the visited communication network.

In some embodiments, the method further comprises receiving control signaling from the first network node in the first communication network. In this case, the information is received in association with receiving the control signaling from the first network node. In one or more of these embodiments, the control signaling received from the first network node is an authentication request requesting authentication of a subscription of the communication device to the second communication network.

In some embodiments, the method further comprises receiving, from the first network node, an authentication request requesting authentication of a subscription of the communication device to the second communication network, wherein the information is included in the authentication request.

In some embodiments, the information further indicates the first communication network is in the control signaling path between the communication device and the second communication network.

In some embodiments, the second communication network is a non-public network, NPN.

In some embodiments, the second communication network is a public network.

In some embodiments, the first communication network is a public network. Additionally or alternatively, the third communication network is a public network.

In some embodiments, the first communication network is a non-public network. Additionally or alternatively, the third communication network is a non-public network.

In some embodiments, first network node is an authentication server or implements an authentication server function. Additionally or alternatively, the second network node is an authentication server or implements an authentication server function.

In some embodiments, the third communication network is a roaming partner of the first communication network, the first communication network is a home public network of the communication device, and the third communication network is a visited network of the communication device.

In some embodiments, the method further comprises applying, based on the information, one or more policies with respect to a subscription of the communication device to the second communication network. In one or more of these embodiments, the one or more policies include a policy that specifies, based on the information, whether the communication device is allowed to register with the first communication network, the second communication network, and/or the third communication network. Additionally or alternatively, the one or more policies include a policy that specifies, based on the information, whether to authenticate the subscription of the communication device to the second communication network. In one or more of these embodiments, the one or more policies include a policy that specifies, based on the information, which one or more services of the first communication network, the second communication network, and/or the third communication network the communication device is allowed to use. Additionally or alternatively, the one or more policies include a policy that specifies, based on the information, which one or more network slices of the first communication network, the second communication network, and/or the third communication network the communication device is allowed to use.

Other embodiments herein include a first network node configured for use in a first communication network. The first network node comprises communication circuitry and processing circuitry. The processing circuitry is configured to transmit, to a second network node in a second communication network, information that indicates a third communication network is in a control signaling path between a communication device and the second communication network.

In some embodiments, the processing circuitry configured to perform the steps described above for the first network node.

Other embodiments herein include a second network node in a second communication network. The second communication network comprises communication circuitry and processing circuitry. The processing circuitry is configured to receive, from a first network node in a first communication network, information that indicates a third communication network is in a control signaling path between a communication device and the second wireless communication network.

In some embodiments, the processing circuitry configured to perform the steps described above for the second network node.

Other embodiments herein include a computer program comprising instructions which, when executed by at least one processor of a network node, causes the network node to perform the steps described above for the first network node and the second network node. In some embodiments, carrier containing the computer program described above is one of an electronic signal, optical signal, radio signal, or computer readable storage medium.

BRIEF DESCRIPTION OF THE DRAWINGS

FIG. 3 is a logic flow diagram of a method performed by a first network node in a first communication network according to some embodiments.

FIG. 4 is a logic flow diagram of a method performed by a second network node in a second communication network according to some embodiments.

DETAILED DESCRIPTION

Figure 1:
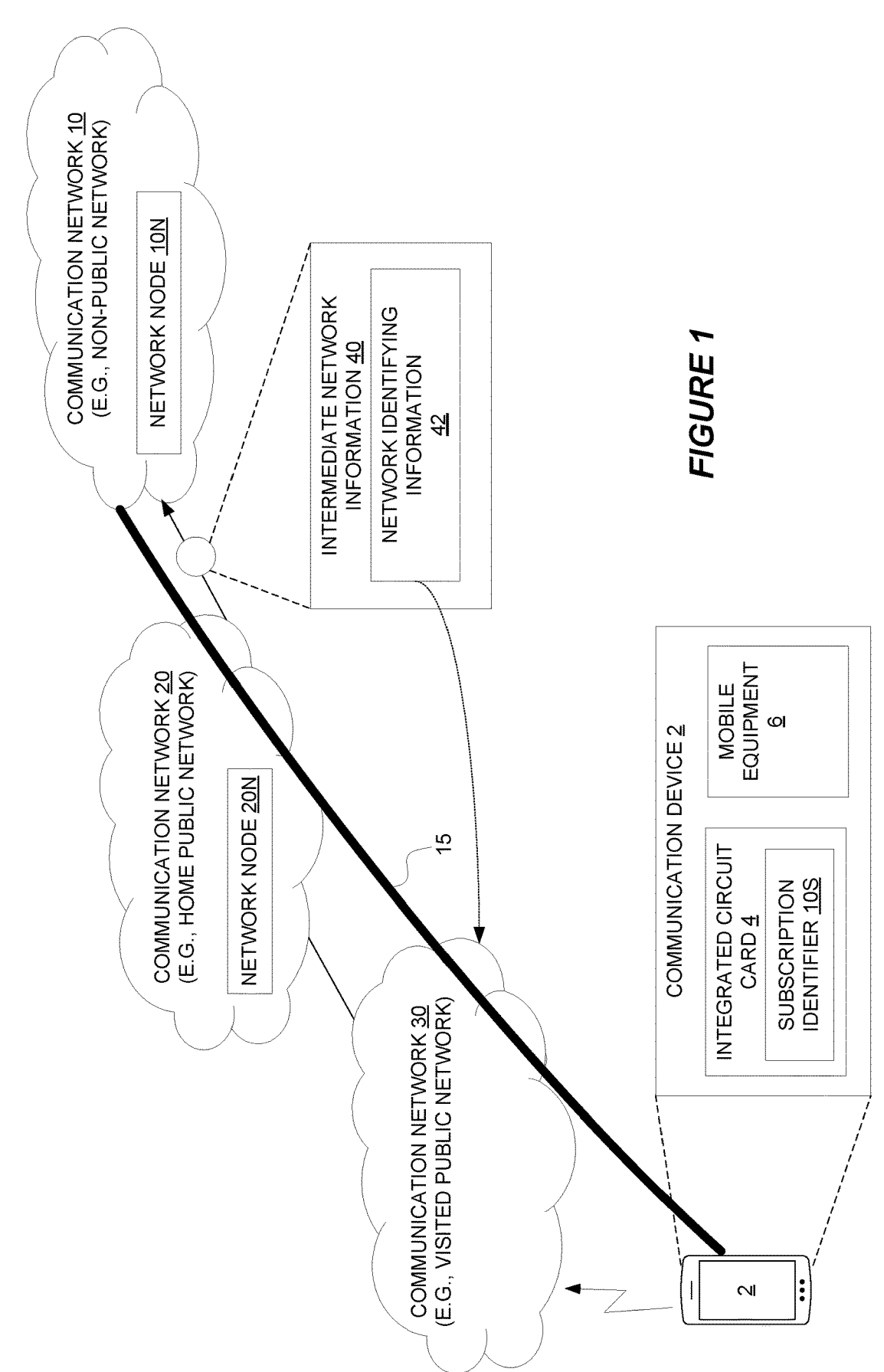
FIG. 1 is a block diagram of communication networks according to some embodiments.

FIG. 1 shows a communication device 2 configured for communication. In some embodiments, the communication device 2 is a wireless communication device configured for wireless communication. As shown in FIG. 1, for example, the communication device is exemplified as a user equipment (UE) or mobile device.

In any event, the communication device 2 is associated with a subscription to communication network 10. FIG. 1 depicts this association as being by way of an integrated circuit card 4 (e.g., a subscriber identity module, SIM) that is configured to be removably inserted into or embedded or integrated in the communication device 2. This integrated circuit card 4 stores in memory a subscription identifier 10S that identifies the subscription to communication network 10. The subscription identifier 10S may for example be an International Mobile Subscriber Identity (IMSI), a Network Access Identifier (NAI), or any other type of Subscription Permanent Identifier (SUPI). The integrated circuit card 4 may also store credentials (e.g., one or more keys) associated with the subscription identifier 10S. In other embodiments not shown, though, the subscription identifier 10S and any associated credentials may be stored directly on the communication device 2 itself, e.g., on mobile equipment (ME) 6. Regardless of how the subscription identifier 10S is associated with the communication device 2, the communication device 2 may indicate the subscription identifier 10S to communication network 10 as part of a procedure to register with and/or authenticate itself to the communication network 10, e.g., as a prerequisite to being provided communication service from the communication network 10.

As shown in FIG. 1, though, the communication device 2 does not necessarily access communication network 10 directly. Instead, the communication device 2 accesses communication network 10 via intermediate communication networks 20 and 30. Intermediate communication networks 20, 30 are different from one another and different from communication network 10, e.g., in the sense that the networks 10, 20, and 30 have different operators and/or use different communication technologies. In any event, as shown, the intermediate communication networks 20 and 30 form a chain of networks via which the communication device 2 accesses communication network 10.

In some embodiments, for example, communication network 20 shares its radio access network (RAN) with communication network 10 so as to provide radio access to subscribers of communication network 10. And communication network 20 may in turn have a direct roaming partnership with communication network 30, so that communication device 2 may roam to communication network 30 and access communication network 20 via communication network 30. In this case, even though communication network 30 does not have a direct roaming partnership with communication network 10, the communication device 2 is still able to access communication network 10 via communication network 30 by way of the roaming partnership between communication network 20 and communication network 30.

In these and other embodiments, then, the path 15 that control signaling takes between the communication device 2 and communication network 10 traverses intermediate communication networks 20 and 30. For example, control signaling for registering with and/or authenticating to communication network 10 traverses intermediate communication networks 20 and 30 on the path 15 between the communication device 2 and communication network 10. The path 15 may thereby represent the end-to-end connection between the communication device 2 and communication network 10.

In this context, some embodiments herein inform communication network 10 about any intermediate communication network(s) 20, 30 that are in the control signaling path 15 between the communication device 2 and communication network 10. One or more embodiments, for example, inform communication network 10 about the existence of and/or identity of one or more of the intermediate communication networks 20 and 30. Accordingly, rather than being ignorant of whether the communication device 2 accesses communication network 10 via an intermediate network (e.g., because the communication network 10 does not have a direct roaming partnership with that intermediate network), communication network 10 is equipped with information about such an intermediate network. Communication network 10 can then use this information for any number of policy decisions, e.g., whether to permit access via an intermediate network, whether to permit a certain service when accessed via an intermediate network, how to treat a session of the communication device, etc. Some embodiments thereby safeguard the communication network's ability to control whether and/or which intermediate network(s) are usable to access the communication network 10, even when the communication devices 2 access the communication network 10 via an intermediate network that does not have a direct roaming partnership with the communication network 10.

More particularly, FIG. 1 shows that communication network 20 transmits intermediate network information 40 to communication network 10. This intermediate network information 40 indicates communication network 30 is in the control signaling path 15 between the communication device 2 and communication network 10. That is, the intermediate network information 40 indicates control signaling between the communication device 2 and communication network 10 passes through communication network 30.

In some embodiments, for example, the intermediate network information 40 includes network identifying information 42 as shown. The network identifying information 42 indicates at least a portion of the identity or name of communication network 30. The network identifying information 42 thereby actually identifies which communication network (namely, communication network 30) is in the control signaling path 15. The network identifying information 42 may for instance indicate at least a portion of a Serving Network Name (SNN) which identifies communication network 30. Or, the network identifying information 42 may indicate a Mobile Network Code (MNC) and/or Mobile Country Code (MCC) associated with communication network 30.

In other embodiments, the intermediate network information 40 simply indicates the existence of some unidentified intermediate communication network in the control signaling path 15. In this case, for instance, the intermediate network information 40 may indicate communication network 30 is in the control signaling path 15, without indicating any portion of the identity or name of communication network 30. In these and other embodiments, for example, the intermediate network information 40 may just be a binary flag that indicates whether or not some intermediate communication network is in the control signaling path 15. And, based on communication network 30 being in the control signaling path 15, that flag may be set to indicate that indeed some intermediate communication network is in the control signaling path 15. As another example, the intermediate network information 40 may indicate that the communication device 2 is roaming or that the communication device 2 is served by a visited communication network, i.e., a roaming partner of communication network 20. As still another example, the intermediate network information 40 may indicate that such a visited communication network of the communication device 2 is in the control signaling path 15.

Of course, the intermediate network information 40 may similarly also indicate communication network 20 as being in the control signaling path 15, e.g., in the same way(s) as described above with respect to communication network 30. In this case, then, the intermediate network information 40 indicates multiple communication networks 20, 30 are in the control signaling path 15.

No matter the particular nature of the intermediate network information 40, though, communication network 20 in some embodiments transmits the intermediate network information 40 to communication network 10 along with, included in, and/or otherwise in association with other control signaling (e.g., an authentication request) that the communication network 20 transmits to communication network 10. In one or more embodiments, for example, communication network 20 receives control signaling (e.g., an authentication request) from communication network 30 that prompts communication network 20 to transmit the same or different control signaling (e.g., a corresponding authentication request) to communication network 10. In this case, communication equipment 20 may transmit intermediate network information 40 within or in association with the control signaling to communication network 10.

Consider an example communication network 10 is a non-public network (NPN), whereas communication networks 20 and 30 are each a public network. An NPN as used herein is a network intended for non-public use. An NPN may for example be a network that is at least partly private. An NPN may thereby have one or more parts in an isolated network deployment that does not interact with a public network. At least one or more parts of an NPN may for example be operated by a private network operator which only allows certain pre-registered clients to attach to it. In some embodiments, though, some network functionality may be provided by a public network operator. For example, some network functionality, such as radio access and/or the control plane, may be provided by a public network operator, e.g., as a service for the private network operator.

As a particular concrete use case, an NPN may be a so-called standalone NPN (SNPN). In some embodiments, all functionality of the SNPN is provided by a private network operator. In other embodiments, all functionality of the SNPN except for radio access is provided by a private network operator, with radio access being provided by (e.g., shared with) a public network operator. The public network in this case may advertise a so-called network identifier (NID) of the NPN over the radio interface, so that communication devices can discover the NID and know that the NPN can be accessed via the public network. In some embodiments, globally unique NIDs identify different NPNs, whereas in other embodiments different combinations of PLMN IDs and NIDs identify different NPNs. An SNPN in either case may for example be a smart factory network that uses an intermediate private or public 5G network for radio access.

Regardless, in embodiments where communication network 10 is an NPN 10, communication network 20 may be a public network that provides an access network for communication network 10, e.g., according to a business agreement between the communication network operators. Communication network 20 may in this case be referred to as a home public network 20 (e.g., home public land mobile network, HPLMN) of the communication device 2, with respect to the NPN 10. The home public network 20 may in some cases even advertise, over at least a part of its coverage area, an NID of the NPN 10. In one or more of these embodiments, the communication device 2 may be preconfigured with information about the home public network 20, e.g., PLMN ID. The communication device 2 may in this case be configured to scan for the home public network 20, based on the understanding that the home public network 20 provides radio access for the NPN 10. When the communication device 2 discovers the home public network 20, in conjunction with the NID being advertised by the home public network 20, the communication device 2 can attempt to access the NPN 10 via the home public network 20. For example, the communication device 2 can perform a procedure to register with and/or authenticate itself to the NPN 10, via the home public network 20. This procedure may involve transmitting the subscription identifier 10S, or a concealed version thereof, to the home public network 20.

Notably, FIG. 1 also shows that embodiments herein enable the communication device 2 to access, register with, and/or authenticate to the NPN 10 even when roaming away from the home public network 20. FIG. 1 in this regard shows that the communication network 30 may be another public network that is a roaming partner of the home public network 20, e.g., according to a business agreement. Communication network 30 is therefore referred to as a visited public network 30. This visited public network 30 may provide radio access to the communication device 2 when the communication device 2 is outside of the geographical area(s) within which the home public network 20 provides radio coverage and/or advertises the NID of the NPN 10. Indeed, the communication device 2 according to some embodiments may scan not only for the home public network 20, but also scan for the visited public network 30. The visited public network 30 may for example be included in a list at the communication device 2 that indicates one or more allowed visited networks, e.g., that are each a roaming partner of the home public network 20. That is, the communication device 2 may be preconfigured with information about the roaming partner(s) of the home public network 20. If the communication device 2 discovers the visited public network 30, the communication device 2 may register with and/or authenticate with the NPN 10 via the home public network 20 and the visited public network 30. In this case, then, the authentication procedure between the communication device 2 and the NPN 2 is performed through both the home public network 20 and the visited public network 30.

In the context of this example, the home public network 20 transmits the intermediate network information 40 to the NPN 10 in order to indicate to the NPN 10 that a visited public network 30 is in the control plane path 15 between the communication device 2 and the NPN 10. The intermediate network information 40 may thereby indicate to the NPN 10 the existence of and/or identity of the visited public network 30 used by the communication device 2. The intermediate network information 40 in some embodiments may also indicate to the NPN 10 the existence of and/or identity of the home public network 20 used by the communication device. Based on this intermediate network information 40, the NPN 10 can implement policy-based decisions on how to treat a session of the communication device 2, e.g., from a security perspective. The intermediate network information 40 therefore enables the NPN 10 to more precisely understand the communication setup for the communication device's session and correspondingly have a more detailed security policy for that session.

Figure 2:
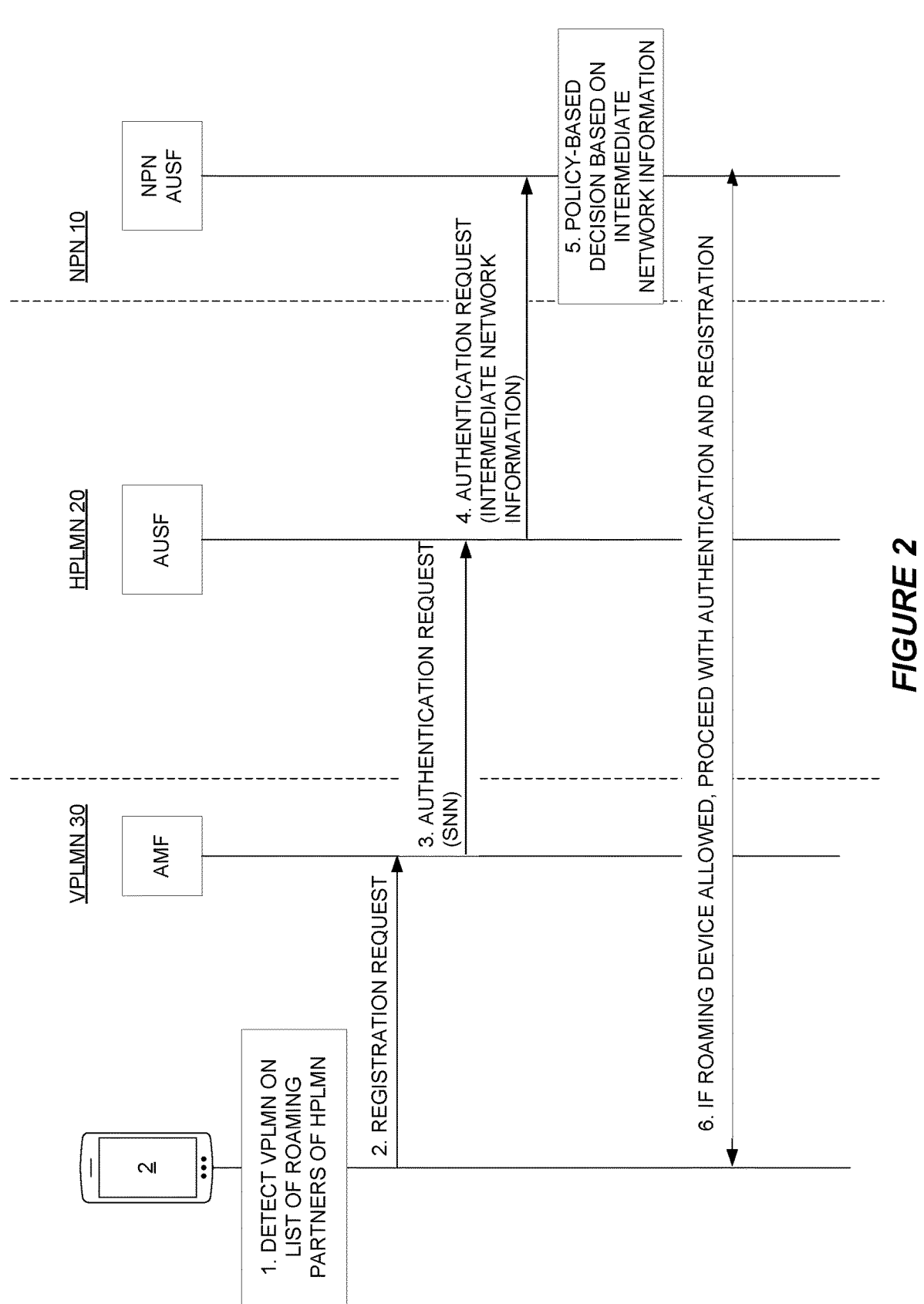
FIG. 2 is a call flow diagram of a procedure for registering a communication device with a non-public network according to some embodiments.

FIG. 2 shows a call flow for an example where communication network 10 is an NPN, and the communication device 2 registers with the NPN 10 via the HPLMN 20 and VPLMN 30 according to some embodiments. As shown, the communication device 2 wants to connect to the NPN 10, but cannot see the NID of the NPN 10 being broadcasted. But the communication device 2 does detect the VPLMN 30, which is on a list of roaming partners of the HPLMN 20 for the NPN 10 (Step 1). Accordingly, the communication device 2 transmits a registration request to an Access and Mobility Function (AMF) in the VPLMN 30, e.g., where the registration request indicates the subscription identifier 10S (or a concealed version thereof) which identifies the communication device's subscription to the NPN 10 (Step 2).

The AMF in the VPLMN 30 identifies the communication device 2 as being a roaming subscriber of the HPLMN 20. The AMF in some embodiments may be unaware that the communication device 2 is actually a client of the NPN 10 instead of the HPLMN 20. The AMF in the VPLMN 30 correspondingly transmits a request (e.g., an authentication request) to the HPLMN 20, e.g., an Authentication Server Function (AUSF) in the HPLMN 20 (Step 3). The AUSF in the HPLMN in this case exemplifies the network node 20N in FIG. 1. The request includes the serving network name (SNN) of the VPLMN 30 via which the communication device 2 is requesting registration.

The HPLMN 20 processes the request as the HPLMN 20 would any other request from the VPLMN 30 as a roaming partner. But the HPLMN 20 notices that the wireless device 2 is a subscriber of the NPN 10, meaning that primary authentication is to be performed by the NPN 10. So the HPLMN 20 (e.g., the AUSF in the HPLMN 20) transmits a request (e.g., an authentication request) to the NPN 10, e.g., an AUSF in the NPN 10 (Step 4). The request message may be similar to a Nausf UEAuthentication Authenticate Request message. Regardless, this request includes the intermediate network information 40, e.g., in the form of the SNN received in the authentication request from the VPLMN 30 or in the form of an MCC and/or MNC associated with the VPLMN 30. The HPLMN 20 knows to include the intermediate network information 40 in the request because the wireless device 2 is to be served by a further network, which in this case is the NPN 10, e.g., such that the HPLMN 20 only includes the intermediate network information 40 in this example if the wireless device 2 is to be served by an NPN.

The NPN 10 correspondingly makes a policy-based decision based at least in part on this intermediate network information 40. This decision may be made for instance by an AUSF in the NPN 10, or a node that has one or more AUSF-like functions. Regardless, the policy-based decision may for example include a decision about whether or not to allow the registration and/or authentication requested by the communication device 2. The NPN 10 may for example accept the registration or authentication only if the communication device 2 is not registering or authenticating via any intermediate communication network. Or, as another example, the NPN 10 may accept the registration or authentication if the communication device 2 is registering or authenticating via the HPLMN 20 alone but reject the registration or authentication if the communication device 2 is registering or authenticating also via the VPLMN 30. Or, as still another example, the NPN 10 may accept the registration or authentication if the communication device 2 is registering or authenticating via the HPLMN 20 alone or if the communication device 2 is registering or authenticating via a VPLMN included in a list of one or more trusted VPLMNs, but reject the registration or authentication if the communication device 2 is registering or authenticating via a VPLMN not included in the list of trusted VPLMN(s). This list of trusted VPLMN(s) may for example be formulated based on reputation for security, confirmation of security measurements taken by the VPLMN(s), operator country, or the like. Generally, then, the policy-based decision may include a decision about whether the communication device 2 is allowed to register with the NPN 10 or about whether to authenticate the communication device 2 to the NPN 10.

As another example, the policy-based decision may include a decision about which service(s) are allowed to be provided to the communication device 2. The NPN 10 may for example limit available services based on whether or which VPLMN(s) are in the control signaling path 15 via which the communication device 2 is registering. In one such embodiment, the NPN 10 may implement a special network slice for a VPLMN-connected communication device, in order to keep that device's traffic isolated from other traffic and to keep the communication device from certain services in the NPN. A VPLMN-connected communication device may for instance be limited to services provided by a User Plane Function (UPF) in the NPN 10, e.g., for Internet access. This may be useful to, for example, allow the communication device 2 to have Internet connectivity even when roaming to a VPLMN but to only allow the communication device 2 to have access to NPN-internal services and data when connected locally, either directly to the NPN 10 or indirectly via only the HPLMN 20. This approach would remove the need for a second PLMN subscription in the communication device 2 as everything could be handled with the NPN subscription. Generally, though, the policy-based decision may include a decision about which one or more services of communication network 10, communication network 20, or communication 30 the communication device 2 is allowed to use and/or which one or more network slices of communication network 10, communication network 20, or communication 30 the communication device 2 is allowed to use.

Note, too, that any policy-based decision may be made with finer granularity, on a country by country basis for example. In one such embodiment, the decision about whether or not to allow a registration depends on a country-specific limitation. The country-specific limitation may for instance mean that the NPN 10 accepts a registration if the communication device 2 is registering via a VPLMN that is located in any of one or more allowed countries but rejects the registration if the communication device 2 is registering via a VPLMN that is not located in any of the one or more allowed countries. The country-specific limitation may thereby allow the NPN 10 to discriminate registration acceptance on the basis that different countries implement different security requirements or different data usage/storage rules.

Note further that a local policy on which the policy-based decision is made may be generally applicable to all subscriptions or communication devices, or may be specific to a certain subscription or communication device. In the latter case, a suitable policy may be included in the NPN subscriber database, i.e., for each subscription the database indicates what policy is to be applied for deciding whether to allow registration via a VPLMN. The subscriber database may for example include the policy itself in each subscription, or include a pointer to a policy in a policy database. Or, a default policy may be applied if a subscription lacks an explicit policy to be applied.

In any event, FIG. 2 shows that if the NPN 10 allows the registration request of the roaming communication device 2, the procedure for authentication and registration proceeds (Step 6). This may involve the NPN 10 responding to the registration (or authentication) request and allowing for the procedure to run its course to get the communication device 2 registered or authenticated. That said, even if the policy-based decision is to allow registration, the decision may further concern limitations on the allowed registration. For example, the decision may be to apply rules or restrictions on the registration, e.g., that certain services (such as Ultra Reliance Low Latency Communications, URLLC, or local breakout) are not allowed via a certain VPLMN. In such case, the rules or restrictions may be returned to the VPLMN 30 via the HPLMN 20. Regardless, if the decision is to reject the registration, a reject reply may be returned to the communication device 2 via the HPLMN 20 and VPLMN 30 (not shown). The reject reply may be a currently standardized reject reply, or a new reject message may be defined which indicates that registration (or authentication) to the NPN 10 is not allowed via the VPLMN 30.

As this example demonstrates, then, some embodiments bolster the trust that the NPN 10 has in the HPLMN 20 because the HPLMN 20 makes known the existence and/or identity of a VPLMN via which the communication device 2 registers. Alternatively or additionally, some embodiments enable the NPN 10 to impose different requirements for different communication devices or subscriptions with respect to how they are allowed to connect to the NPN 10 and/or what types of services are available to a communication device based on how that device connects to the NPN 10. Alternatively or additionally, the NPN 10 may use the intermediate network information 40 to generate suitable identifiers (e.g., a Subscription Permanent Identifier, SUPI) and security key(s) during registration of the communication device 2 with the NPN 10.

In some embodiments, the intermediate network information 40 may also indicate if the communication device 2 accesses the NPN 10 via a radio network node of the HPLMN 20 that does not advertise the NID of the NPN 10. The intermediate network information 40 may for instance include an indication "HPLMN_NO_NID". An example scenario is if the NID is only advertised in the location of a factory with the NPN 10. In this case, if the communication device 2 accesses the NPN via a radio network node of the HPLMN 20 that is in some location other than the factory, the NPN 10 may have a policy that limits the service(s) that the NPN 10 provides to the communication device 2 when accessed from such location.

Note further that, although some embodiments are described above with focus on registration of the communication device 2 with the subscribed communication network 10 (e.g., NPN), registration herein may be performed (or viewed as being performed) with any of the subscribed communication network 10, the intermediate communication network 20, and/or the serving communication network 30. Embodiments described above for registration with the subscribed communication network 10 may be similarly applied for registration with the intermediate communication network 20 and/or the serving communication network 30, e.g., in terms of a policy-based decision for whether to allow such registration.

In view of the modifications and variations herein, FIG. 3 depicts a method performed by a first network node 20N in a first communication network 20 in accordance with particular embodiments. The method includes transmitting, to a second network node 10N in a second communication network 10, information 40 that indicates a third communication network 30 is in a control signaling path 15 between a communication device 2 and the second communication network 10 (Block 310).

In some embodiments, the information 40 indicates at least a portion of an identity or name of the third communication network 30 that is in the control signaling path 15. In other embodiments, by contrast, the information 40 indicates a third communication network 30 is in the control signaling path 15, without indicating any portion of an identity or name of the third communication network 30. In these and other embodiments, for example, the information 40 may indicate a third communication network is in the control signaling path by indicate that the communication device 2 is roaming or that the communication device 2 is served by a visited communication network.

In some embodiments, the information 40 indicates a third communication network 30 is in the control signaling path 15 by indicating that a visited communication network of the communication device 2 is in the control signaling path 15 and/or by indicating an identity or name of the visited communication network.

FIG. 3 shows that the method may further comprise receiving control signaling from a third network node in the third communication network 30 (Block 300). The control signaling may for example be an authentication request requesting authentication of a subscription of the communication device 2 to the second communication network 10. Regardless, based on receiving the control signaling from the third network node in the third communication network 30, the method may also comprise transmitting control signaling to the second network node 10N (Block 305). For example, the transmitted control signaling may be the same or a different authentication request requesting authentication of a subscription of the communication device to the second communication network 10. In any event, in one or more of these embodiments, the information 40 is transmitted to the second network node 10N in association with transmitting the control signaling to the second network node 10N.

Although not shown, the method in some embodiments may further comprise transmitting, to the second network node 10N, an authentication request requesting authentication of a subscription of the communication device 2 to the second communication network 10. In this case, the information 40 may be included in the authentication request.

In some embodiments, the information 40 further indicates the first communication network 20 is in the control signaling path 15 between the wireless device 2 and the second communication network 10.

In some embodiments, the second communication network 10 is a non-public network (NPN). In other embodiments, the second communication network 10 is a public network.

In some embodiments, the first communication network 20 is a public network and/or the third communication network 30 is a public network. In other embodiments, the first communication network 20 is a non-public network and/or the third communication network 30 is a non-public network.

In some embodiments, the first network node 20N is an authentication server or implements an authentication server function, and/or the second network node 10N is an authentication server or implements an authentication server function.

In some embodiments, the third communication network 30 is a roaming partner of the first communication network 20, the first communication network 20 is a home public network of the communication device 2, and wherein the third communication network is a visited network of the communication device 2.

In some embodiments, the method also includes applying one or more policies based on the information 40 (Block 320). For example, the one or more policies may include a policy that specifies, based on the information 40, whether the communication device 2 is allowed to register with the first communication network 20. Alternatively or additionally, the one or more policies may include a policy that specifies, based on the information 40, which one or more services of the first communication network 20, the second communication network 10, and/or the third communication network 30 the communication device 2 is allowed to use and/or which one or more network slices of the first communication network 20, the second communication network 10, and/or the third communication network 30 the communication device 2 is allowed to use.

FIG. 4 depicts a method performed by a second network node 10N in a second communication network 10 in accordance with other particular embodiments. The method includes receiving, from a first network node 20N in a first communication network 20, information 40 that indicates a third communication network 30 is in a control signaling path 15 between a communication device 2 and the second communication network 10 (Block 400).

In some embodiments, the information 40 indicates at least a portion of an identity or name of the third communication network 30 that is in the control signaling path 15. In other embodiments, by contrast, the information 40 indicates a third communication network 30 is in the control signaling path 15, without indicating any portion of an identity or name of the third communication network 30. In these and other embodiments, for example, the information 40 may indicates a third communication network 30 is in the control signaling path by indicate that the communication device 2 is roaming or that the communication device 2 is served by a visited communication network.

In some embodiments, the information 40 indicates a third communication network 30 is in the control signaling path 15 by indicating that a visited communication network of the communication device 2 is in the control signaling path 15 and/or by indicating an identity or name of the visited communication network.

In some embodiments, the method may comprise receiving control signaling from the first network node 20N in the first communication network 20, where the information 40 is received in association with receiving the control signaling from the first network node 20N.

In some embodiments, the control signaling received from the first network node 20N is an authentication request requesting authentication of a subscription of the communication device 2 to the second communication network 10.

In some embodiments, the method further comprises receiving, from the first network node 20N, an authentication request requesting authentication of a subscription of the communication device 2 to the second communication network 10, where the information 40 is included in the authentication request.

In some embodiments, the information 40 further indicates the first communication network 20 is in the control signaling path 15 between the communication device 2 and the second communication network 10.

In some embodiments, the second communication network 10 is a non-public network (NPN). In other embodiments, the second communication network 10 is a public network.

In some embodiments, the first communication network 20 is a public network and/or the third communication network 30 is a public network. In other embodiments, the first communication network 20 is a non-public network and/or the third communication network 30 is a non-public network.

In some embodiments, the first network node 20N is an authentication server or implements an authentication server function, and/or wherein the second network node 10N is an authentication server or implements an authentication server function.

In some embodiments, the third communication network 30 is a roaming partner of the first communication network 20, the first communication network 20 is a home public network of the communication device 2, and the third communication network 30 is a visited network of the communication device 2.

Regardless, the method as shown may further comprise applying, based on the information 40, one or more policies with respect to a subscription of the communication device 2 to the second communication network 10 (Block 410). This may entail, for instance, making a policy-based decision as described herein. In any event, the one or more policies may include a policy that specifies, based on the information 40, whether the communication device 2 is allowed to register with the second communication network 10 and/or whether to authenticate the subscription of the communication device 2 to the second communication network 10. Alternatively or additionally, the one or more policies may include a policy that specifies, based on the information 40, which one or more services of the first communication network 20, the second communication network 10, and/or the third communication network 30 the communication device 2 is allowed to use and/or which one or more network slices of the first communication network 20, the second communication network 10, and/or the third communication network 30 the communication device 2 is allowed to use.

Embodiments herein also include corresponding apparatuses. Embodiments herein for instance include a communication device 2 configured to perform any of the steps of any of the embodiments described above for the communication device 2.

Embodiments also include a first network node 20N comprising processing circuitry and power supply circuitry. The processing circuitry is configured to perform any of the steps of any of the embodiments described above for the first network node 20N. The power supply circuitry is configured to supply power to the first network node 20N.

Embodiments further include a first network node 20N comprising processing circuitry. The processing circuitry is configured to perform any of the steps of any of the embodiments described above for the first network node 20N. In some embodiments, the first network node 20N further comprises communication circuitry.

Embodiments further include a first network node 20N comprising processing circuitry and memory. The memory contains instructions executable by the processing circuitry whereby the first network node 20N is configured to perform any of the steps of any of the embodiments described above for the first network node 20N.

Embodiments herein also include a second network node 10N configured to perform any of the steps of any of the embodiments described above for the second network node 10N.

Embodiments also include a second network node 10N comprising processing circuitry and power supply circuitry.

The processing circuitry is configured to perform any of the steps of any of the embodiments described above for the second network node 10N. The power supply circuitry is configured to supply power to the second network node 10N.

Embodiments further include a second network node 10N comprising processing circuitry. The processing circuitry is configured to perform any of the steps of any of the embodiments described above for the second network node 10N. In some embodiments, the second network node 10N further comprises communication circuitry.

Embodiments further include a second network node 10N comprising processing circuitry and memory. The memory contains instructions executable by the processing circuitry whereby the second network node 10N is configured to perform any of the steps of any of the embodiments described above for the second network node 10N.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 5:
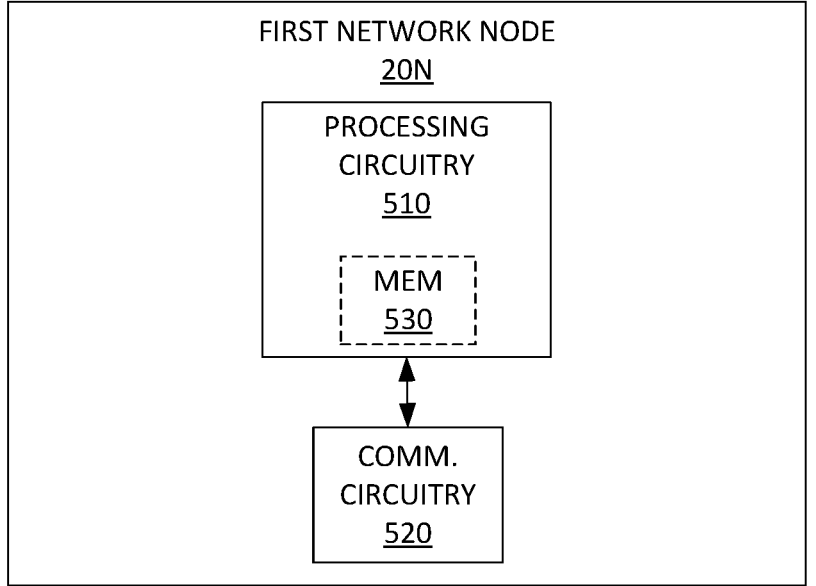
FIG. 5 is a block diagram of a first network node in a first communication network according to some embodiments.

FIG. 5 for example illustrates a first network node 20N as implemented in accordance with one or more embodiments. As shown, the first network node 20N includes processing circuitry 510 and communication circuitry 520. The communication circuitry 520 (e.g., radio circuitry) is configured to transmit and/or receive information to and/or from one or more other nodes, e.g., via any communication technology. The processing circuitry 510 is configured to perform processing described above, e.g., in FIG. 3, such as by executing instructions stored in memory 530. The processing circuitry 510 in this regard may implement certain functional means, units, or modules.

Figure 6:
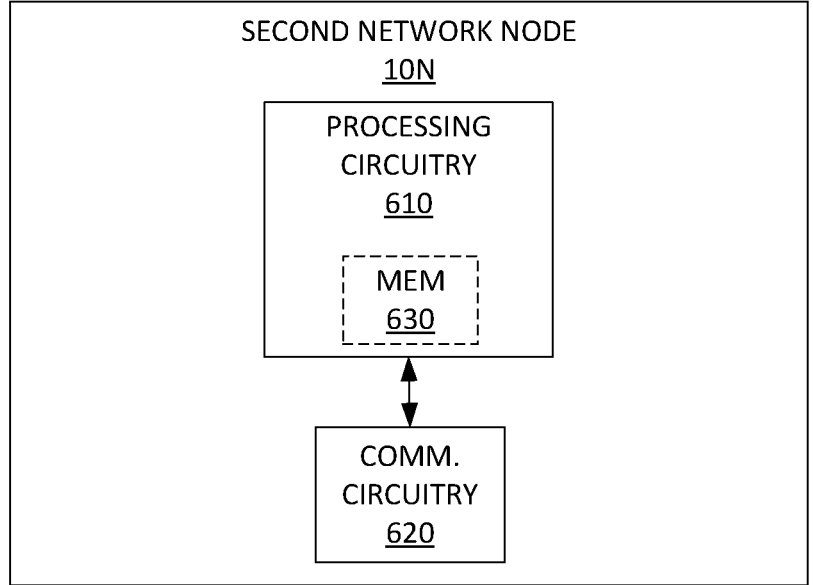
FIG. 6 is a block diagram of a second network node in a second communication network according to some embodiments.

FIG. 6 illustrates a second network node 10N as implemented in accordance with one or more embodiments. As shown, the second network node 10N includes processing circuitry 610 and communication circuitry 620. The communication circuitry 620 is configured to transmit and/or receive information to and/or from one or more other nodes, e.g., via any communication technology. The processing circuitry 610 is configured to perform processing described above, e.g., in FIG. 4, such as by executing instructions stored in memory 630. The processing circuitry 610 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Embodiments herein may apply to any type of communication, whether wireless or wireline. When applied to wireless communication, for example, the communication device 2 may be a wireless communication device and one or more of the networks 10, 20, 30 may be a wireless communication network.

Figure 7:
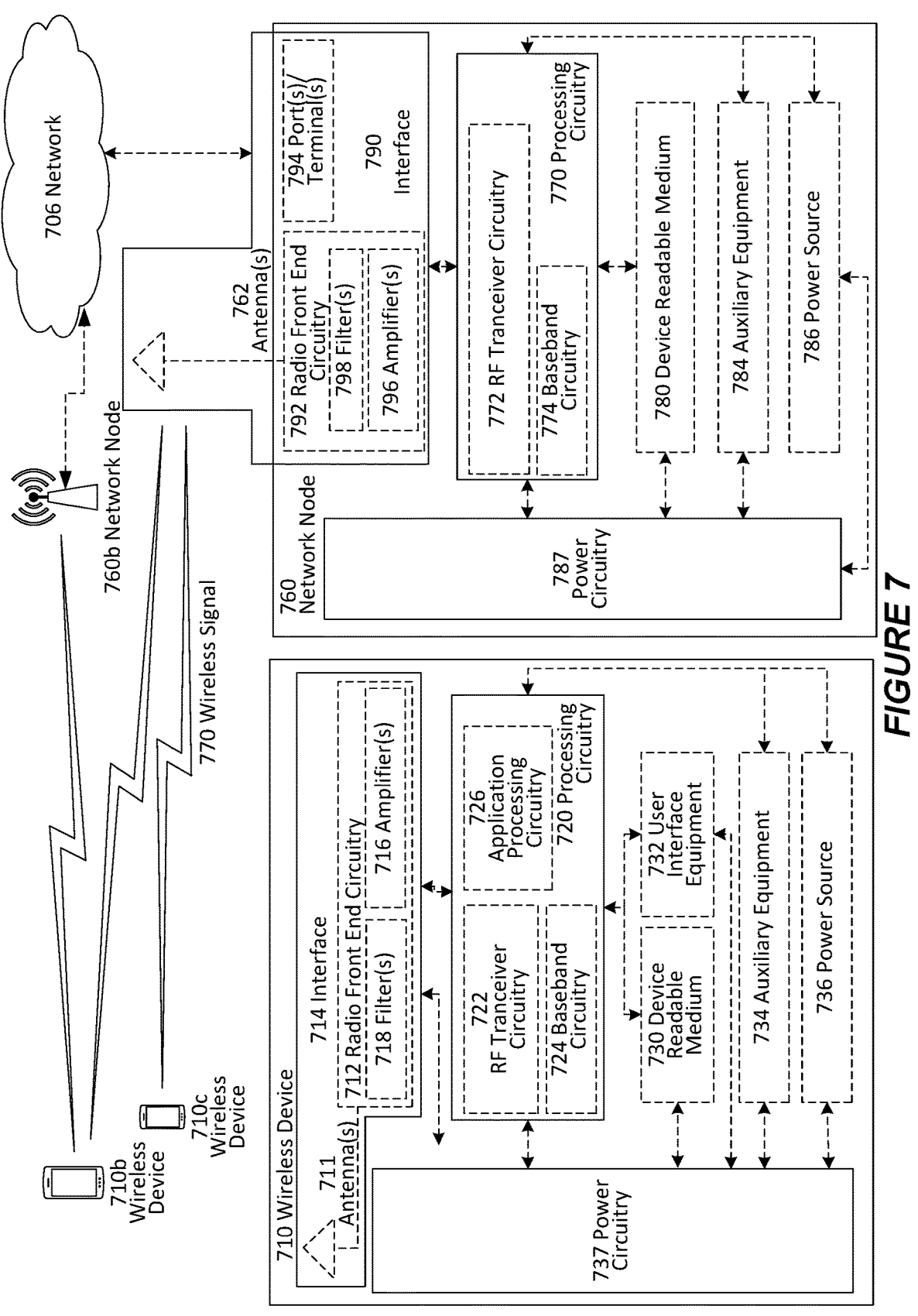
FIG. 7 is a block diagram of a wireless communication network according to some embodiments.

More particularly, although the subject matter described herein may be implemented in any appropriate type of system using any suitable components, the embodiments disclosed herein may in particular be applicable in a wireless network, such as the example wireless network illustrated in FIG. 7. For simplicity, the wireless network of FIG. 7 only depicts network 706, network nodes 760 and 760b, and WDs 710, 710b, and 710c. In practice, a wireless network may further include any additional elements suitable to support communication between wireless devices or between a wireless device and another communication device, such as a landline telephone, a service provider, or any other network node or end device. Of the illustrated components, network node 760 and wireless device (WD) 710 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 706 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 760 and WD 710 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node 760 includes processing circuitry 770, device readable medium 780, interface 790, auxiliary equipment 784, power source 786, power circuitry 787, and antenna 762. Although network node 760 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 760 are depicted as single boxes located within a larger box, or nested within multiple boxes, in practice, a network node may comprise multiple different physical components that make up a single illustrated component (e.g., device readable medium 780 may comprise multiple separate hard drives as well as multiple RAM modules).

Similarly, network node 760 may be composed of multiple physically separate components (e.g., a NodeB component and a RNC component, or a BTS component and a BSC component, etc.), which may each have their own respective components. In certain scenarios in which network node 760 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 760 may be configured to support multiple radio access technologies (RATs). In such embodiments, some components may be duplicated (e.g., separate device readable medium 780 for the different RATs) and some components may be reused (e.g., the same antenna 762 may be shared by the RATs). Network node 760 may also include multiple sets of the various illustrated components for different wireless technologies integrated into network node 760, such as, for example, GSM, WCDMA, LTE, NR, WiFi, or Bluetooth wireless technologies. These wireless technologies may be integrated into the same or different chip or set of chips and other components within network node 760.

Processing circuitry 770 is configured to perform any determining, calculating, or similar operations (e.g., certain obtaining operations) described herein as being provided by a network node. These operations performed by processing circuitry 770 may include processing information obtained by processing circuitry 770 by, for example, converting the obtained information into other information, comparing the obtained information or converted information to information stored in the network node, and/or performing one or more operations based on the obtained information or converted information, and as a result of said processing making a determination.

Processing circuitry 770 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 760 components, such as device readable medium 780, network node 760 functionality. For example, processing circuitry 770 may execute instructions stored in device readable medium 780 or in memory within processing circuitry 770. Such functionality may include providing any of the various wireless features, functions, or benefits discussed herein. In some embodiments, processing circuitry 770 may include a system on a chip (SOC).

In some embodiments, processing circuitry 770 may include one or more of radio frequency (RF) transceiver circuitry 772 and baseband processing circuitry 774. In some embodiments, radio frequency (RF) transceiver circuitry 772 and baseband processing circuitry 774 may be on separate chips (or sets of chips), boards, or units, such as radio units and digital units. In alternative embodiments, part or all of RF transceiver circuitry 772 and baseband processing circuitry 774 may be on the same chip or set of chips, boards, or units In certain embodiments, some or all of the functionality described herein as being provided by a network node, base station, eNB or other such network device may be performed by processing circuitry 770 executing instructions stored on device readable medium 780 or memory within processing circuitry 770. In alternative embodiments, some or all of the functionality may be provided by processing circuitry 770 without executing instructions stored on a separate or discrete device readable medium, such as in a hard-wired manner. In any of those embodiments, whether executing instructions stored on a device readable storage medium or not, processing circuitry 770 can be configured to perform the described functionality. The benefits provided by such functionality are not limited to processing circuitry 770 alone or to other components of network node 760, but are enjoyed by network node 760 as a whole, and/or by end users and the wireless network generally.

Device readable medium 780 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 770. Device readable medium 780 may store any suitable instructions, data or information, including a computer program, software, an application including one or more of logic, rules, code, tables, etc. and/or other instructions capable of being executed by processing circuitry 770 and, utilized by network node 760. Device readable medium 780 may be used to store any calculations made by processing circuitry 770 and/or any data received via interface 790. In some embodiments, processing circuitry 770 and device readable medium 780 may be considered to be integrated.

Interface 790 is used in the wired or wireless communication of signalling and/or data between network node 760, network 706, and/or WDs 710. As illustrated, interface 790 comprises port(s)/terminal(s) 794 to send and receive data, for example to and from network 706 over a wired connection. Interface 790 also includes radio front end circuitry 792 that may be coupled to, or in certain embodiments a part of, antenna 762. Radio front end circuitry 792 comprises filters 798 and amplifiers 796. Radio front end circuitry 792 may be connected to antenna 762 and processing circuitry 770. Radio front end circuitry may be configured to condition signals communicated between antenna 762 and processing circuitry 770. Radio front end circuitry 792 may receive digital data that is to be sent out to other network nodes or WDs via a wireless connection. Radio front end circuitry 792 may convert the digital data into a radio signal having the appropriate channel and bandwidth parameters using a combination of filters 798 and/or amplifiers 796. The radio signal may then be transmitted via antenna 762. Similarly, when receiving data, antenna 762 may collect radio signals which are then converted into digital data by radio front end circuitry 792. The digital data may be passed to processing circuitry 770. In other embodiments, the interface may comprise different components and/or different combinations of components.

In certain alternative embodiments, network node 760 may not include separate radio front end circuitry 792, instead, processing circuitry 770 may comprise radio front end circuitry and may be connected to antenna 762 without separate radio front end circuitry 792. Similarly, in some embodiments, all or some of RF transceiver circuitry 772 may be considered a part of interface 790. In still other embodiments, interface 790 may include one or more ports or terminals 794, radio front end circuitry 792, and RF transceiver circuitry 772, as part of a radio unit (not shown), and interface 790 may communicate with baseband processing circuitry 774, which is part of a digital unit (not shown).

Antenna 762 may include one or more antennas, or antenna arrays, configured to send and/or receive wireless signals. Antenna 762 may be coupled to radio front end circuitry 790 and may be any type of antenna capable of transmitting and receiving data and/or signals wirelessly. In some embodiments, antenna 762 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 762 may be separate from network node 760 and may be connectable to network node 760 through an interface or port.

Antenna 762, interface 790, and/or processing circuitry 770 may be configured to perform any receiving operations and/or certain obtaining operations described herein as being performed by a network node. Any information, data and/or signals may be received from a wireless device, another network node and/or any other network equipment. Similarly, antenna 762, interface 790, and/or processing circuitry 770 may be configured to perform any transmitting operations described herein as being performed by a network node. Any information, data and/or signals may be transmitted to a wireless device, another network node and/or any other network equipment.

Power circuitry 787 may comprise, or be coupled to, power management circuitry and is configured to supply the components of network node 760 with power for performing the functionality described herein. Power circuitry 787 may receive power from power source 786. Power source 786 and/or power circuitry 787 may be configured to provide power to the various components of network node 760 in a form suitable for the respective components (e.g., at a voltage and current level needed for each respective component). Power source 786 may either be included in, or external to, power circuitry 787 and/or network node 760. For example, network node 760 may be connectable to an external power source (e.g., an electricity outlet) via an input circuitry or interface such as an electrical cable, whereby the external power source supplies power to power circuitry 787. As a further example, power source 786 may comprise a source of power in the form of a battery or battery pack which is connected to, or integrated in, power circuitry 787. The battery may provide backup power should the external power source fail. Other types of power sources, such as photovoltaic devices, may also be used.

Alternative embodiments of network node 760 may include additional components beyond those shown in FIG. 7 that may be responsible for providing certain aspects of the network node's functionality, including any of the functionality described herein and/or any functionality necessary to support the subject matter described herein. For example, network node 760 may include user interface equipment to allow input of information into network node 760 and to allow output of information from network node 760. This may allow a user to perform diagnostic, maintenance, repair, and other administrative functions for network node 760.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 710 includes antenna 711, interface 714, processing circuitry 720, device readable medium 730, user interface equipment 732, auxiliary equipment 734, power source 736 and power circuitry 737. WD 710 may include multiple sets of one or more of the illustrated components for different wireless technologies supported by WD 710, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 710.

Antenna 711 may include one or more antennas or antenna arrays, configured to send and/or receive wireless signals, and is connected to interface 714. In certain alternative embodiments, antenna 711 may be separate from WD 710 and be connectable to WD 710 through an interface or port. Antenna 711, interface 714, and/or processing circuitry 720 may be configured to perform any receiving or transmitting operations described herein as being performed by a WD. Any information, data and/or signals may be received from a network node and/or another WD. In some embodiments, radio front end circuitry and/or antenna 711 may be considered an interface.

As illustrated, interface 714 comprises radio front end circuitry 712 and antenna 711. Radio front end circuitry 712 comprise one or more filters 718 and amplifiers 716. Radio front end circuitry 714 is connected to antenna 711 and processing circuitry 720, and is configured to condition signals communicated between antenna 711 and processing circuitry 720. Radio front end circuitry 712 may be coupled to or a part of antenna 711. In some embodiments, WD 710 may not include separate radio front end circuitry 712; rather, processing circuitry 720 may comprise radio front end circuitry and may be connected to antenna 711. Similarly, in some embodiments, some or all of RF transceiver circuitry 722 may be considered a part of interface 714. Radio front end circuitry 712 may receive digital data that is to be sent out to other network nodes or WDs via a wireless connection. Radio front end circuitry 712 may convert the digital data into a radio signal having the appropriate channel and bandwidth parameters using a combination of filters 718 and/or amplifiers 716. The radio signal may then be transmitted via antenna 711. Similarly, when receiving data, antenna 711 may collect radio signals which are then converted into digital data by radio front end circuitry 712. The digital data may be passed to processing circuitry 720. In other embodiments, the interface may comprise different components and/or different combinations of components.

Processing circuitry 720 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 710 components, such as device readable medium 730, WD 710 functionality. Such functionality may include providing any of the various wireless features or benefits discussed herein. For example, processing circuitry 720 may execute instructions stored in device readable medium 730 or in memory within processing circuitry 720 to provide the functionality disclosed herein.

As illustrated, processing circuitry 720 includes one or more of RF transceiver circuitry 722, baseband processing circuitry 724, and application processing circuitry 726. In other embodiments, the processing circuitry may comprise different components and/or different combinations of components. In certain embodiments processing circuitry 720 of WD 710 may comprise a SOC. In some embodiments, RF transceiver circuitry 722, baseband processing circuitry 724, and application processing circuitry 726 may be on separate chips or sets of chips. In alternative embodiments, part or all of baseband processing circuitry 724 and application processing circuitry 726 may be combined into one chip or set of chips, and RF transceiver circuitry 722 may be on a separate chip or set of chips. In still alternative embodiments, part or all of RF transceiver circuitry 722 and baseband processing circuitry 724 may be on the same chip or set of chips, and application processing circuitry 726 may be on a separate chip or set of chips. In yet other alternative embodiments, part or all of RF transceiver circuitry 722, baseband processing circuitry 724, and application processing circuitry 726 may be combined in the same chip or set of chips. In some embodiments, RF transceiver circuitry 722 may be a part of interface 714. RF transceiver circuitry 722 may condition RF signals for processing circuitry 720.

In certain embodiments, some or all of the functionality described herein as being performed by a WD may be provided by processing circuitry 720 executing instructions stored on device readable medium 730, which in certain embodiments may be a computer-readable storage medium. In alternative embodiments, some or all of the functionality may be provided by processing circuitry 720 without executing instructions stored on a separate or discrete device readable storage medium, such as in a hard-wired manner. In any of those particular embodiments, whether executing instructions stored on a device readable storage medium or not, processing circuitry 720 can be configured to perform the described functionality. The benefits provided by such functionality are not limited to processing circuitry 720 alone or to other components of WD 710, but are enjoyed by WD 710 as a whole, and/or by end users and the wireless network generally.

Processing circuitry 720 may be configured to perform any determining, calculating, or similar operations (e.g., certain obtaining operations) described herein as being performed by a WD. These operations, as performed by processing circuitry 720, may include processing information obtained by processing circuitry 720 by, for example, converting the obtained information into other information, comparing the obtained information or converted information to information stored by WD 710, and/or performing one or more operations based on the obtained information or converted information, and as a result of said processing making a determination.

Device readable medium 730 may be operable to store a computer program, software, an application including one or more of logic, rules, code, tables, etc. and/or other instructions capable of being executed by processing circuitry 720. Device readable medium 730 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 720. In some embodiments, processing circuitry 720 and device readable medium 730 may be considered to be integrated.

User interface equipment 732 may provide components that allow for a human user to interact with WD 710. Such interaction may be of many forms, such as visual, audial, tactile, etc. User interface equipment 732 may be operable to produce output to the user and to allow the user to provide input to WD 710. The type of interaction may vary depending on the type of user interface equipment 732 installed in WD 710. For example, if WD 710 is a smart phone, the interaction may be via a touch screen; if WD 710 is a smart meter, the interaction may be through a screen that provides usage (e.g., the number of gallons used) or a speaker that provides an audible alert (e.g., if smoke is detected). User interface equipment 732 may include input interfaces, devices and circuits, and output interfaces, devices and circuits. User interface equipment 732 is configured to allow input of information into WD 710, and is connected to processing circuitry 720 to allow processing circuitry 720 to process the input information. User interface equipment 732 may include, for example, a microphone, a proximity or other sensor, keys/buttons, a touch display, one or more cameras, a USB port, or other input circuitry. User interface equipment 732 is also configured to allow output of information from WD 710, and to allow processing circuitry 720 to output information from WD 710. User interface equipment 732 may include, for example, a speaker, a display, vibrating circuitry, a USB port, a headphone interface, or other output circuitry. Using one or more input and output interfaces, devices, and circuits, of user interface equipment 732, WD 710 may communicate with end users and/or the wireless network, and allow them to benefit from the functionality described herein.

Auxiliary equipment 734 is operable to provide more specific functionality which may not be generally performed by WDs. This may comprise specialized sensors for doing measurements for various purposes, interfaces for additional types of communication such as wired communications etc. The inclusion and type of components of auxiliary equipment 734 may vary depending on the embodiment and/or scenario.

Power source 736 may, in some embodiments, be in the form of a battery or battery pack. Other types of power sources, such as an external power source (e.g., an electricity outlet), photovoltaic devices or power cells, may also be used. WD 710 may further comprise power circuitry 737 for delivering power from power source 736 to the various parts of WD 710 which need power from power source 736 to carry out any functionality described or indicated herein. Power circuitry 737 may in certain embodiments comprise power management circuitry. Power circuitry 737 may additionally or alternatively be operable to receive power from an external power source; in which case WD 710 may be connectable to the external power source (such as an electricity outlet) via input circuitry or an interface such as an electrical power cable. Power circuitry 737 may also in certain embodiments be operable to deliver power from an external power source to power source 736. This may be, for example, for the charging of power source 736. Power circuitry 737 may perform any formatting, converting, or other modification to the power from power source 736 to make the power suitable for the respective components of WD 710 to which power is supplied.

Figure 8:
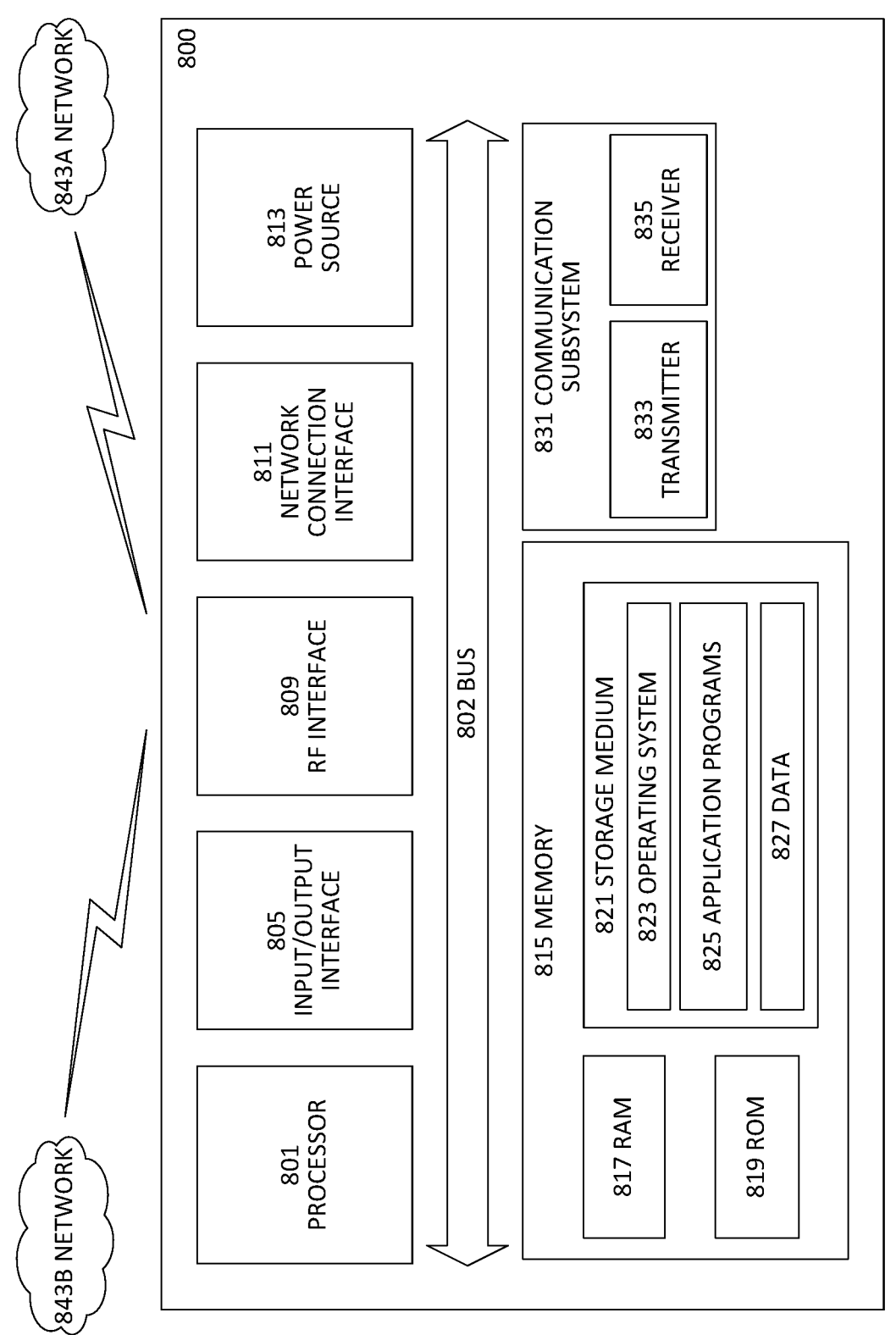
FIG. 8 is a block diagram of a user equipment according to some embodiments.

FIG. 8 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 8200 may be any UE identified by the 3$^{rd}$ Generation Partnership Project (3GPP), including a NB-IoT UE, a machine type communication (MTC) UE, and/or an enhanced MTC (eMTC) UE. UE 800, as illustrated in FIG. 8, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 8 is a UE, the components discussed herein are equally applicable to a WD, and vice-versa.

In FIG. 8, UE 800 includes processing circuitry 801 that is operatively coupled to input/output interface 805, radio frequency (RF) interface 809, network connection interface 811, memory 815 including random access memory (RAM) 817, read-only memory (ROM) 819, and storage medium 821 or the like, communication subsystem 831, power source 833, and/or any other component, or any combination thereof. Storage medium 821 includes operating system 823, application program 825, and data 827. In other embodiments, storage medium 821 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 801 may be configured to process computer instructions and data. Processing circuitry 801 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 801 may include two central processing units (CPUs). Data may be information in a form suitable for use by a computer.

In the depicted embodiment, input/output interface 805 may be configured to provide a communication interface to an input device, output device, or input and output device. UE 800 may be configured to use an output device via input/output interface 805. An output device may use the same type of interface port as an input device. For example, a USB port may be used to provide input to and output from UE 800. The output device may be a speaker, a sound card, a video card, a display, a monitor, a printer, an actuator, an emitter, a smartcard, another output device, or any combination thereof. UE 800 may be configured to use an input device via input/output interface 805 to allow a user to capture information into UE 800. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 809 may be configured to provide a communication interface to RF components such as a transmitter, a receiver, and an antenna. Network connection interface 811 may be configured to provide a communication interface to network 843$a$. Network 843$a$ may encompass wired and/or wireless networks such as a local-area network (LAN), a wide-area network (WAN), a computer network, a wireless network, a telecommunications network, another like network or any combination thereof. For example, network 843*a* may comprise a Wi-Fi network. Network connection interface 811 may be configured to include a receiver and a transmitter interface used to communicate with one or more other devices over a communication network according to one or more communication protocols, such as Ethernet, TCP/IP, SONET, ATM, or the like. Network connection interface 811 may implement receiver and transmitter functionality appropriate to the communication network links (e.g., optical, electrical, and the like). The transmitter and receiver functions may share circuit components, software or firmware, or alternatively may be implemented separately.

RAM 817 may be configured to interface via bus 802 to processing circuitry 801 to provide storage or caching of data or computer instructions during the execution of software programs such as the operating system, application programs, and device drivers. ROM 819 may be configured to provide computer instructions or data to processing circuitry 801. For example, ROM 819 may be configured to store invariant low-level system code or data for basic system functions such as basic input and output (I/O), startup, or reception of keystrokes from a keyboard that are stored in a non-volatile memory. Storage medium 821 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 821 may be configured to include operating system 823, application program 825 such as a web browser application, a widget or gadget engine or another application, and data file 827. Storage medium 821 may store, for use by UE 800, any of a variety of various operating systems or combinations of operating systems.

Storage medium 821 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 821 may allow UE 800 to access computer-executable instructions, application programs or the like, stored on transitory or non-transitory memory media, to off-load data, or to upload data. An article of manufacture, such as one utilizing a communication system may be tangibly embodied in storage medium 821, which may comprise a device readable medium.

In FIG. 8, processing circuitry 801 may be configured to communicate with network 843*b* using communication subsystem 831. Network 843*a* and network 843*b* may be the same network or networks or different network or networks. Communication subsystem 831 may be configured to include one or more transceivers used to communicate with network 843*b*. For example, communication subsystem 831 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 833 and/or receiver 835 to implement transmitter or receiver functionality, respectively, appropriate to the RAN links (e.g., frequency allocations and the like). Further, transmitter 833 and receiver 835 of each transceiver may share circuit components, software or firmware, or alternatively may be implemented separately.

In the illustrated embodiment, the communication functions of communication subsystem 831 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 831 may include cellular communication, Wi-Fi communication, Bluetooth communication, and GPS communication. Network 843*b* may encompass wired and/or wireless networks such as a local-area network (LAN), a wide-area network (WAN), a computer network, a wireless network, a telecommunications network, another like network or any combination thereof. For example, network 843*b* may be a cellular network, a Wi-Fi network, and/or a near-field network. Power source 813 may be configured to provide alternating current (AC) or direct current (DC) power to components of UE 800.

The features, benefits and/or functions described herein may be implemented in one of the components of UE 800 or partitioned across multiple components of UE 800. Further, the features, benefits, and/or functions described herein may be implemented in any combination of hardware, software or firmware. In one example, communication subsystem 831 may be configured to include any of the components described herein. Further, processing circuitry 801 may be configured to communicate with any of such components over bus 802. In another example, any of such components may be represented by program instructions stored in memory that when executed by processing circuitry 801 perform the corresponding functions described herein. In another example, the functionality of any of such components may be partitioned between processing circuitry 801 and communication subsystem 831. In another example, the non-computationally intensive functions of any of such components may be implemented in software or firmware and the computationally intensive functions may be implemented in hardware.

Figure 9:
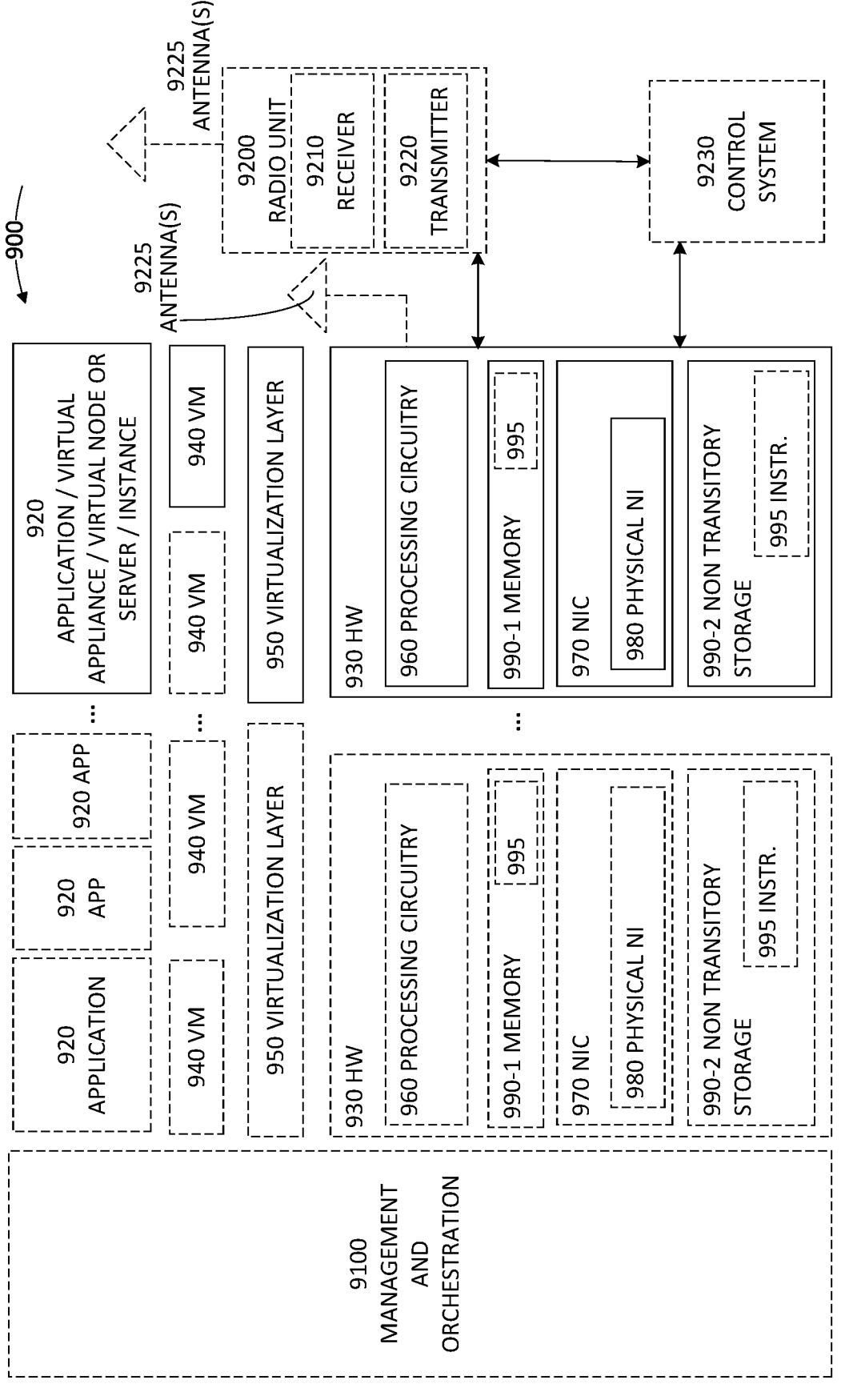
FIG. 9 is a block diagram of a virtualization environment according to some embodiments.

FIG. 9 is a schematic block diagram illustrating a virtualization environment 900 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 900 hosted by one or more of hardware nodes 930. Further, in embodiments in which the virtual node is not a radio access node or does not require radio connectivity (e.g., a core network node), then the network node may be entirely virtualized.

The functions may be implemented by one or more applications 920 (which may alternatively be called software instances, virtual appliances, network functions, virtual nodes, virtual network functions, etc.) operative to implement some of the features, functions, and/or benefits of some of the embodiments disclosed herein. Applications 920 are run in virtualization environment 900 which provides hardware 930 comprising processing circuitry 960 and memory 990. Memory 990 contains instructions 995 executable by processing circuitry 960 whereby application 920 is operative to provide one or more of the features, benefits, and/or functions disclosed herein.

Virtualization environment 900, comprises general-purpose or special-purpose network hardware devices 930 comprising a set of one or more processors or processing circuitry 960, which may be commercial off-the-shelf (COTS) processors, dedicated Application Specific Integrated Circuits (ASICs), or any other type of processing circuitry including digital or analog hardware components or special purpose processors. Each hardware device may comprise memory 990-1 which may be non-persistent memory for temporarily storing instructions 995 or software executed by processing circuitry 960. Each hardware device may comprise one or more network interface controllers (NICs) 970, also known as network interface cards, which include physical network interface 980. Each hardware device may also include non-transitory, persistent, machine-readable storage media 990-2 having stored therein software 995 and/or instructions executable by processing circuitry 960. Software 995 may include any type of software including software for instantiating one or more virtualization layers 950 (also referred to as hypervisors), software to execute virtual machines 940 as well as software allowing it to execute functions, features and/or benefits described in relation with some embodiments described herein.

Virtual machines 940, comprise virtual processing, virtual memory, virtual networking or interface and virtual storage, and may be run by a corresponding virtualization layer 950 or hypervisor. Different embodiments of the instance of virtual appliance 920 may be implemented on one or more of virtual machines 940, and the implementations may be made in different ways.

During operation, processing circuitry 960 executes software 995 to instantiate the hypervisor or virtualization layer 950, which may sometimes be referred to as a virtual machine monitor (VMM). Virtualization layer 950 may present a virtual operating platform that appears like networking hardware to virtual machine 940.

As shown in FIG. 9, hardware 930 may be a standalone network node with generic or specific components. Hardware 930 may comprise antenna 9225 and may implement some functions via virtualization. Alternatively, hardware 930 may be part of a larger cluster of hardware (e.g. such as in a data center or customer premise equipment (CPE)) where many hardware nodes work together and are managed via management and orchestration (MANO) 9100, which, among others, oversees lifecycle management of applications 920.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 940 may be a software implementation of a physical machine that runs programs as if they were executing on a physical, non-virtualized machine. Each of virtual machines 940, and that part of hardware 930 that executes that virtual machine, be it hardware dedicated to that virtual machine and/or hardware shared by that virtual machine with others of the virtual machines 940, forms a separate virtual network elements (VNE).

Still in the context of NFV, Virtual Network Function (VNF) is responsible for handling specific network functions that run in one or more virtual machines 940 on top of hardware networking infrastructure 930 and corresponds to application 920 in FIG. 9.

In some embodiments, one or more radio units 9200 that each include one or more transmitters 9220 and one or more receivers 9210 may be coupled to one or more antennas 9225. Radio units 9200 may communicate directly with hardware nodes 930 via one or more appropriate network interfaces and may be used in combination with the virtual components to provide a virtual node with radio capabilities, such as a radio access node or a base station.

In some embodiments, some signalling can be effected with the use of control system 9230 which may alternatively be used for communication between the hardware nodes 930 and radio units 9200.

Figure 10:
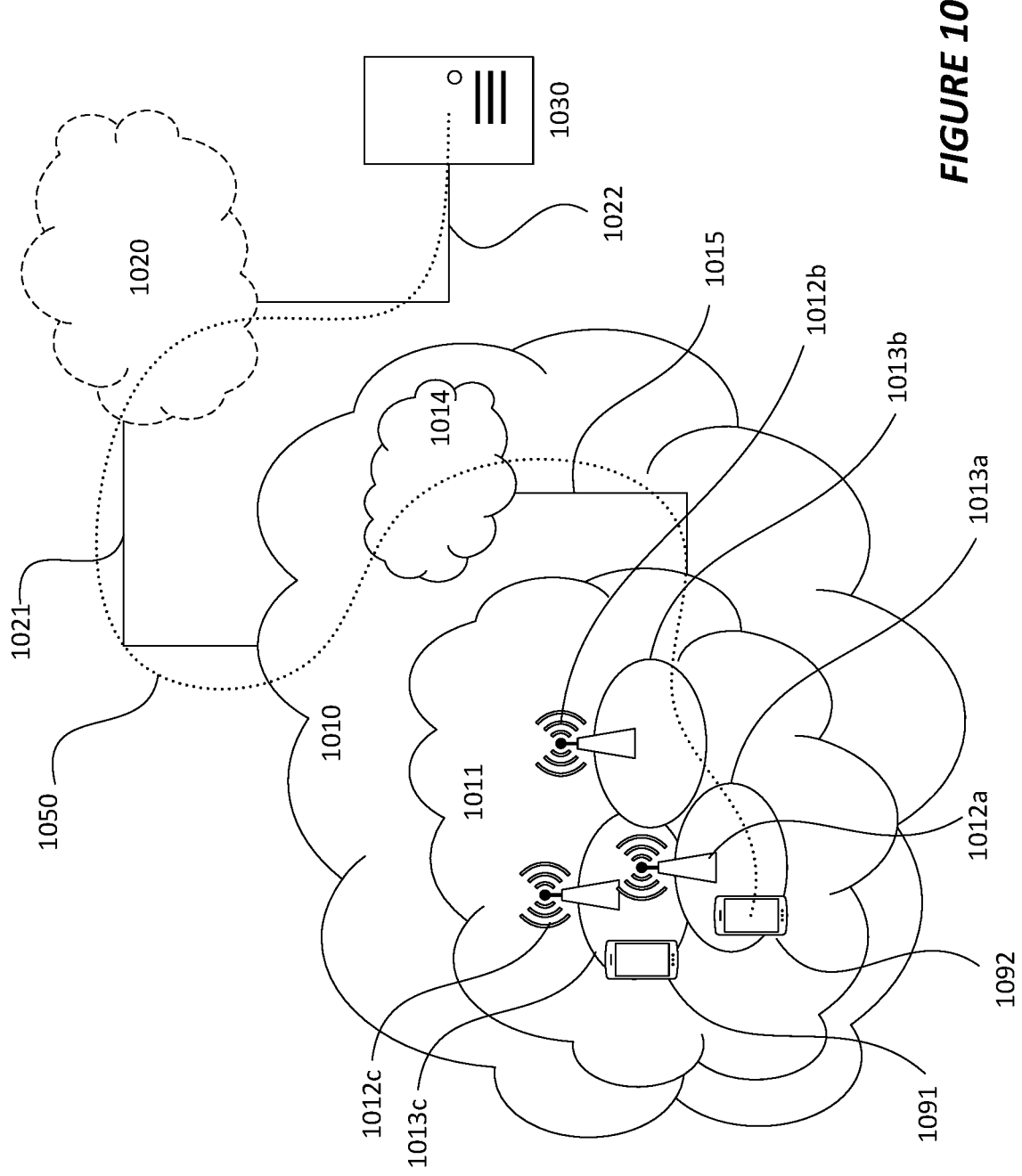
FIG. 10 is a block diagram of a communication network with a host computer according to some embodiments.

FIG. 10 illustrates a telecommunication network connected via an intermediate network to a host computer in accordance with some embodiments. In particular, with reference to FIG. 10, in accordance with an embodiment, a communication system includes telecommunication network 1010, such as a 3GPP-type cellular network, which comprises access network 1011, such as a radio access network, and core network 1014. Access network 1011 comprises a plurality of base stations 1012*a*, 1012*b*, 1012*c*, such as NBs, eNBs, gNBs or other types of wireless access points, each defining a corresponding coverage area 1013*a*, 1013*b*, 1013*c*. Each base station 1012*a*, 1012*b*, 1012*c* is connectable to core network 1014 over a wired or wireless connection 1015. A first UE 1091 located in coverage area 1013*c* is configured to wirelessly connect to, or be paged by, the corresponding base station 1012*c*. A second UE 1092 in coverage area 1013*a* is wirelessly connectable to the corresponding base station 1012*a*. While a plurality of UEs 1091, 1092 are illustrated in this example, the disclosed embodiments are equally applicable to a situation where a sole UE is in the coverage area or where a sole UE is connecting to the corresponding base station 1012.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider, or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private or hosted network; intermediate network 1020, if any, may be a backbone network or the Internet; in particular, intermediate network 1020 may comprise two or more sub-networks (not shown).

The communication system of FIG. 10 as a whole enables connectivity between the connected UEs 1091, 1092 and host computer 1030. The connectivity may be described as an over-the-top (OTT) connection 1050. Host computer 1030 and the connected UEs 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink and downlink communications. For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 1091 towards the host computer 1030.

Figure 11:
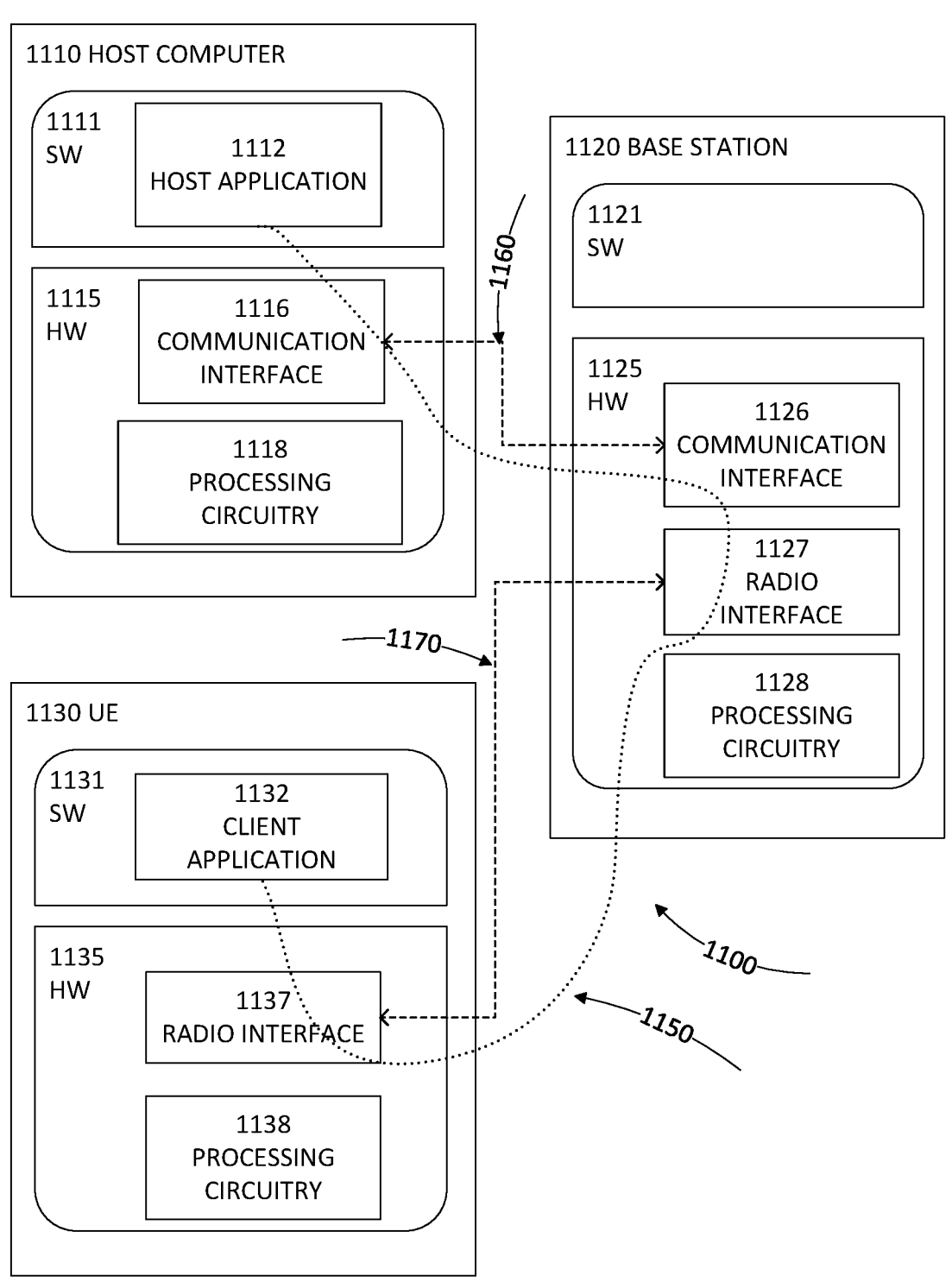
FIG. 11 is a block diagram of a host computer according to some embodiments.

Example implementations, in accordance with an embodiment, of the UE, base station and host computer discussed in the preceding paragraphs will now be described with reference to FIG. 11. FIG. 11 illustrates host computer communicating via a base station with a user equipment over a partially wireless connection in accordance with some embodiments In communication system 1100, host computer 1110 comprises hardware 1115 including communication interface 1116 configured to set up and maintain a wired or wireless connection with an interface of a different communication device of communication system 1100. Host computer 1110 further comprises processing circuitry 1118, which may have storage and/or processing capabilities. In particular, processing circuitry 1118 may comprise one or more programmable processors, application-specific integrated circuits, field programmable gate arrays or combinations of these (not shown) adapted to execute instructions. Host computer 1110 further comprises software 1111, which is stored in or accessible by host computer 1110 and executable by processing circuitry 1118. Software 1111 includes host application 1112. Host application 1112 may be operable to provide a service to a remote user, such as UE 1130 connecting via OTT connection 1150 terminating at UE 1130 and host computer 1110. In providing the service to the remote user, host application 1112 may provide user data which is transmitted using OTT connection 1150.

Communication system 1100 further includes base station 1120 provided in a telecommunication system and comprising hardware 1125 enabling it to communicate with host computer 1110 and with UE 1130. Hardware 1125 may include communication interface 1126 for setting up and maintaining a wired or wireless connection with an interface of a different communication device of communication system 1100, as well as radio interface 1127 for setting up and maintaining at least wireless connection 1170 with UE 1130 located in a coverage area (not shown in FIG. 11) served by base station 1120. Communication interface 1126 may be configured to facilitate connection 1160 to host computer 1110. Connection 1160 may be direct or it may pass through a core network (not shown in FIG. 11) of the telecommunication system and/or through one or more intermediate networks outside the telecommunication system. In the embodiment shown, hardware 1125 of base station 1120 further includes processing circuitry 1128, which may comprise one or more programmable processors, application-specific integrated circuits, field programmable gate arrays or combinations of these (not shown) adapted to execute instructions. Base station 1120 further has software 1121 stored internally or accessible via an external connection.

Communication system 1100 further includes UE 1130 already referred to. Its hardware 1135 may include radio interface 1137 configured to set up and maintain wireless connection 1170 with a base station serving a coverage area in which UE 1130 is currently located. Hardware 1135 of UE 1130 further includes processing circuitry 1138, which may comprise one or more programmable processors, application-specific integrated circuits, field programmable gate arrays or combinations of these (not shown) adapted to execute instructions. UE 1130 further comprises software 1131, which is stored in or accessible by UE 1130 and executable by processing circuitry 1138. Software 1131 includes client application 1132. Client application 1132 may be operable to provide a service to a human or non-human user via UE 1130, with the support of host computer 1110. In host computer 1110, an executing host application 1112 may communicate with the executing client application 1132 via OTT connection 1150 terminating at UE 1130 and host computer 1110. In providing the service to the user, client application 1132 may receive request data from host application 1112 and provide user data in response to the request data. OTT connection 1150 may transfer both the request data and the user data. Client application 1132 may interact with the user to generate the user data that it provides.

It is noted that host computer 1110, base station 1120 and UE 1130 illustrated in FIG. 11 may be similar or identical to host computer 1030, one of base stations 1012a, 1012b, 1012c and one of UEs 1091, 1092 of FIG. 10, respectively. This is to say, the inner workings of these entities may be as shown in FIG. 11 and independently, the surrounding network topology may be that of FIG. 10.

In FIG. 11, OTT connection 1150 has been drawn abstractly to illustrate the communication between host computer 1110 and UE 1130 via base station 1120, without explicit reference to any intermediary devices and the precise routing of messages via these devices. Network infrastructure may determine the routing, which it may be configured to hide from UE 1130 or from the service provider operating host computer 1110, or both. While OTT connection 1150 is active, the network infrastructure may further take decisions by which it dynamically changes the routing (e.g., on the basis of load balancing consideration or reconfiguration of the network).

Wireless connection 1170 between UE 1130 and base station 1120 is in accordance with the teachings of the embodiments described throughout this disclosure. One or more of the various embodiments improve the performance of OTT services provided to UE 1130 using OTT connection 1150, in which wireless connection 1170 forms the last segment.

A measurement procedure may be provided for the purpose of monitoring data rate, latency and other factors on which the one or more embodiments improve. There may further be an optional network functionality for reconfiguring OTT connection 1150 between host computer 1110 and UE 1130, in response to variations in the measurement results. The measurement procedure and/or the network functionality for reconfiguring OTT connection 1150 may be implemented in software 1111 and hardware 1115 of host computer 1110 or in software 1131 and hardware 1135 of UE 1130, or both. In embodiments, sensors (not shown) may be deployed in or in association with communication devices through which OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of OTT connection 1150 may include message format, retransmission settings, preferred routing etc.; the reconfiguring need not affect base station 1120, and it may be unknown or imperceptible to base station 1120. Such procedures and functionalities may be known and practiced in the art. In certain embodiments, measurements may involve proprietary UE signaling facilitating host computer 1110's measurements of throughput, propagation times, latency and the like. The measurements may be implemented in that software 1111 and 1131 causes messages to be transmitted, in particular empty or 'dummy' messages, using OTT connection 1150 while it monitors propagation times, errors etc.

Figure 12:
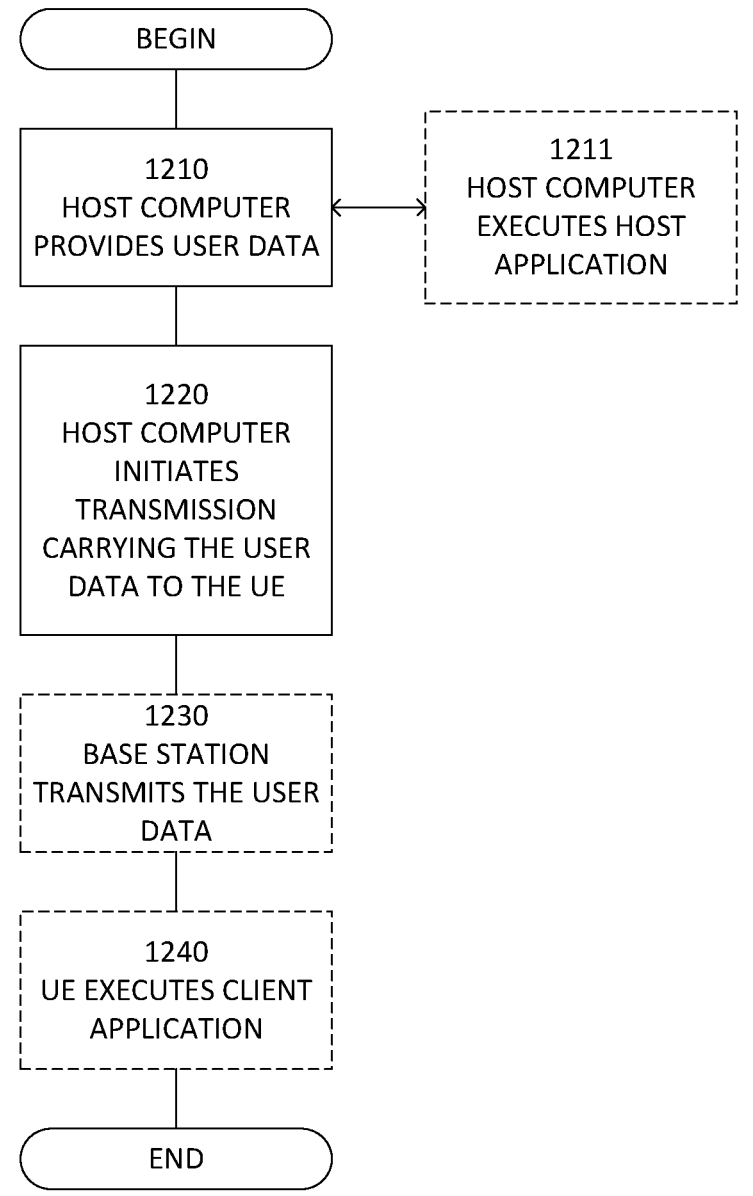
FIG. 12 is a flowchart illustrating a method implemented in a communication system, in accordance with one embodiment.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 1210, the host computer provides user data. In substep 1211 (which may be optional) of step 1210, the host computer provides the user data by executing a host application. In step 1220, the host computer initiates a transmission carrying the user data to the UE. In step 1230 (which may be optional), the base station transmits to the UE the user data which was carried in the transmission that the host computer initiated, in accordance with the teachings of the embodiments described throughout this disclosure. In step 1240 (which may also be optional), the UE executes a client application associated with the host application executed by the host computer.

Figure 13:
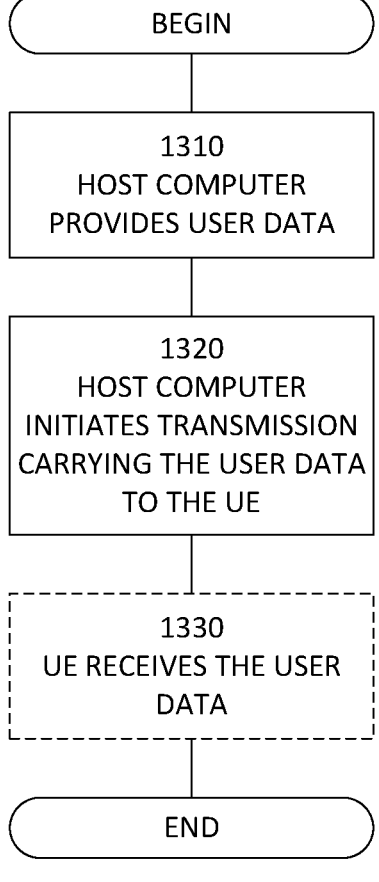
FIG. 13 is a flowchart illustrating a method implemented in a communication system, in accordance with one embodiment.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 1310 of the method, the host computer provides user data. In an optional substep (not shown) the host computer provides the user data by executing a host application. In step 1320, the host computer initiates a transmission carrying the user data to the UE. The transmission may pass via the base station, in accordance with the teachings of the embodiments described throughout this disclosure. In step 1330 (which may be optional), the UE receives the user data carried in the transmission.

Figure 14:
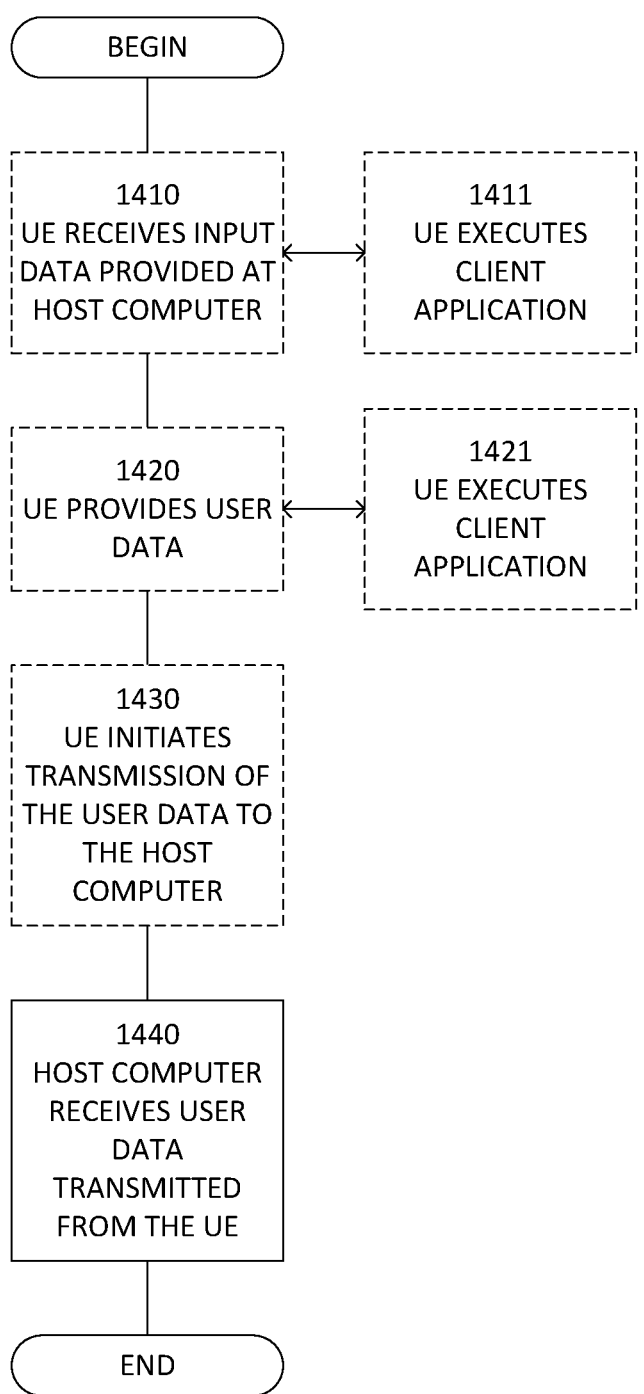
FIG. 14 is a flowchart illustrating a method implemented in a communication system, in accordance with one embodiment.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 1410 (which may be optional), the UE receives input data provided by the host computer. Additionally or alternatively, in step 1420, the UE provides user data. In substep 1421 (which may be optional) of step 1420, the UE provides the user data by executing a client application. In substep 1411 (which may be optional) of step 1410, the UE executes a client application which provides the user data in reaction to the received input data provided by the host computer. In providing the user data, the executed client application may further consider user input received from the user. Regardless of the specific manner in which the user data was provided, the UE initiates, in substep 1430 (which may be optional), transmission of the user data to the host computer. In step 1440 of the method, the host computer receives the user data transmitted from the UE, in accordance with the teachings of the embodiments described throughout this disclosure.

Figure 15:
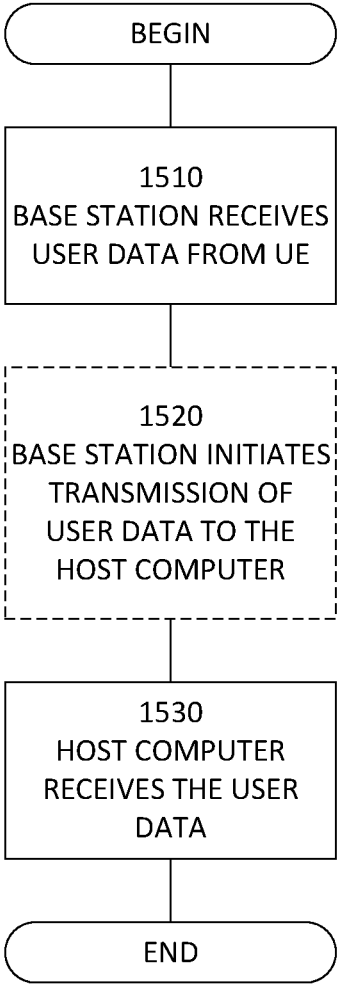
FIG. 15 is a flowchart illustrating a method implemented in a communication system, in accordance with one embodiment.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 1510 (which may be optional), in accordance with the teachings of the embodiments described throughout this disclosure, the base station receives user data from the UE. In step 1520 (which may be optional), the base station initiates transmission of the received user data to the host computer. In step 1530 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate.

Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The term "A and/or B" as used herein covers embodiments having A alone, B alone, or both A and B together. The term "A and/or B" may therefore equivalently mean "at least one of any one or more of A and B".

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method performed by a first network node in a first communication network, the method comprising:
receiving control signaling from a third network node in a third communication network, the third communication network being a visited public land mobile network (VPLMN);
based on receiving the control signaling from the third network node in the third communication network, transmitting control signaling to a second network node in a second communication network, the second communication network being a non-public network (NPN);
transmitting, to the second network node in the second communication network, information that indicates the third communication network is in a control signaling path between a communication device and the second communication network,
wherein the first communication network is a home public land mobile network (HPLMN) of the communication device;
wherein the information is transmitted to the second network node in association with transmitting the control signaling to the second network node; and
wherein the control signaling transmitted to the second network node is an authentication request requesting authentication of a subscription of the communication device to the second communication network.

2. The method of claim 1, wherein the information indicates at least a portion of an identity or name of the third communication network that is in the control signaling path.

3. The method of claim 1, wherein the information indicates the third communication network is in the control signaling path, without indicating any portion of an identity or name of the third communication network.

4. The method of claim 1, wherein the information indicates the third communication network is in the control signaling path by indicating that the communication device is roaming or that the communication device is served by a visited communication network.

5. The method of claim 1, wherein the information indicates the third communication network is in the control signaling path by indicating that a visited communication network of the communication device is in the control signaling path and/or by indicating an identity or name of the visited communication network.

6. The method of claim 1, wherein the information further indicates the first communication network is in the control signaling path between the communication device and the second communication network.

7. A method performed by a second network node in a second communication network, the second communication network being a non-public network (NPN), the method comprising:
receiving, from a first network node in a first communication network, the first communication network being a home public land mobile network (HPLMN), information that indicates a third communication network, the third communication network being a visited public land mobile network (VPLMN), is in a control signaling path between a communication device and the second communication network,
wherein the information is received in association with receiving control signaling from the first network node, the control signaling including an authentication request requesting authentication of a subscription of the communication device to the second communication network.

8. The method of claim 7, wherein the information indicates at least a portion of an identity or name of the third communication network that is in the control signaling path.

9. The method of claim 7, wherein the information indicates the third communication network is in the control signaling path, without indicating any portion of an identity or name of the third communication network.

10. The method of claim 7, wherein the information indicates the third communication network is in the control signaling path by indicating that the communication device is roaming or that the communication device is served by a visited communication network.

11. The method of claim 7, wherein the information indicates the third communication network is in the control signaling path by indicating that a visited communication network of the communication device is in the control signaling path and/or by indicating an identity or name of the visited communication network.

12. The method of claim 7, further comprising receiving control signaling from the first network node in the first communication network, wherein the information is received in association with receiving the control signaling from the first network node.

13. The method of claim 7, wherein the information further indicates the first communication network is in the control signaling path between the communication device and the second communication network.

14. A first network node configured for use in a first communication network, the first network node comprising:
communication circuitry; and
processing circuitry configured to:
receive control signaling from a third network node in a third communication network, the third communication network being a visited public land mobile network (VPLMN);
based on receiving the control signaling from the third network node in the third communication network, transmit control signaling to a second network node in a second communication network, the second communication network being a non-public network (NPN);

transmit, to the second network node in the second communication network, information that indicates the third communication network is in a control signaling path between a communication device and the second communication network, wherein the first communication network is a home public land mobile network (HPLMN) of the communication device;

wherein the information is transmitted to the second network node in association with transmitting the control signaling to the second network node; and wherein the control signaling transmitted to the second network node is an authentication request requesting authentication of a subscription of the communication device to the second communication network.

15. A second network node in a second communication network, the second communication network being a nonpublic network (NPN), the second network node comprising:

communication circuitry; and processing circuitry configured to receive, from a first network node in a first communication network, the first communication network being a home public land mobile network (HPLMN), information that indicates a third communication network, the third communication network being a visited public land mobile network (VPLMN), is in a control signaling path between a communication device and the second wireless communication network, wherein the information is received in association with receiving control signaling from the first network node, the control signaling including an authentication request requesting authentication of a subscription of the communication device to the second communication network.

\* \* \* \* \*